US012673822B1

(12) United States Patent
Malshe et al.

(10) Patent No.: US 12,673,822 B1
(45) Date of Patent: Jul. 7, 2026

(54) PACKAGE STORAGE SPACE OPTIMIZATION SYSTEMS AND METHODS USING RECONFIGURABLE RACKS

(71) Applicant: Amazon Technologies, Inc., Seattle, WA (US)

(72) Inventors: Rohit Malshe, Kirkland, WA (US); Liron David Yedidsion, Redmond, WA (US); Gah-Yi Ban, London (GB); Kyoung Yoon Kim, Bothell, WA (US); Sourabh Puri, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 457 days.

(21) Appl. No.: 18/339,727

(22) Filed: Jun. 22, 2023

(51) Int. Cl.
| | |
|---|---|
| *G06Q 10/08* | (2024.01) |
| *B65G 1/137* | (2006.01) |
| *G05B 15/02* | (2006.01) |
| *G06Q 10/087* | (2023.01) |

(52) U.S. Cl.
CPC ........... *B65G 1/1373* (2013.01); *G05B 15/02* (2013.01); *G06Q 10/087* (2013.01)

(58) Field of Classification Search
CPC ..... B65G 1/1373; G05B 15/02; G06Q 10/087
See application file for complete search history.

(56) References Cited

U.S. PATENT DOCUMENTS

| | | | |
|---|---|---|---|
| 2013/0144429 A1* | 6/2013 | Ragusa | ..................... B07C 3/00 |
| | | | 700/224 |
| 2021/0070547 A1* | 3/2021 | Basam | ............... E04B 1/34869 |
| 2023/0236327 A1* | 7/2023 | Tanaka | ................... G01S 19/43 |
| | | | 455/456.1 |

* cited by examiner

*Primary Examiner* — Rodney A Butler
(74) *Attorney, Agent, or Firm* — Athorus, PLLC

(57) ABSTRACT

Package storage space optimization systems and methods may utilize a combination of fixed racks for standardized packages, fixed racks for non-standardized packages, and reconfigurable racks that can be configured for either standardized packages or non-standardized packages based on an expected package mix. The reconfigurable racks may be manually, semi-automatically, or automatically configured between standardized or non-standardized package configurations. In addition, the reconfigurable racks may include controllers, visual and/or audio output devices, actuators, and/or sensors to facilitate at least partially automated conversion between standardized or non-standardized package configurations.

17 Claims, 10 Drawing Sheets

PACKAGE STORAGE SPACE OPTIMIZATION SYSTEMS AND METHODS USING RECONFIGURABLE RACKS

BACKGROUND

Many companies may receive, sort, store, package, and ship items and/or groups of items from material handling facilities. For example, many companies may receive, sort, and store items or packages in a delivery facility or other material handling facility, and then ship the items or packages to various destinations (e.g., customers, stores) from the delivery facility or other material handling facility. However, package storage space layouts within delivery facilities may be generally fixed or predetermined, thereby making them inflexible to changes in package mix and potentially resulting in incorrect, inefficient, or hazardous delivery processes. Accordingly, there is a need for flexible and reconfigurable package storage space systems and methods to improve the accuracy, efficiency, and safety of delivery processes.

DETAILED DESCRIPTION

Figure 1:
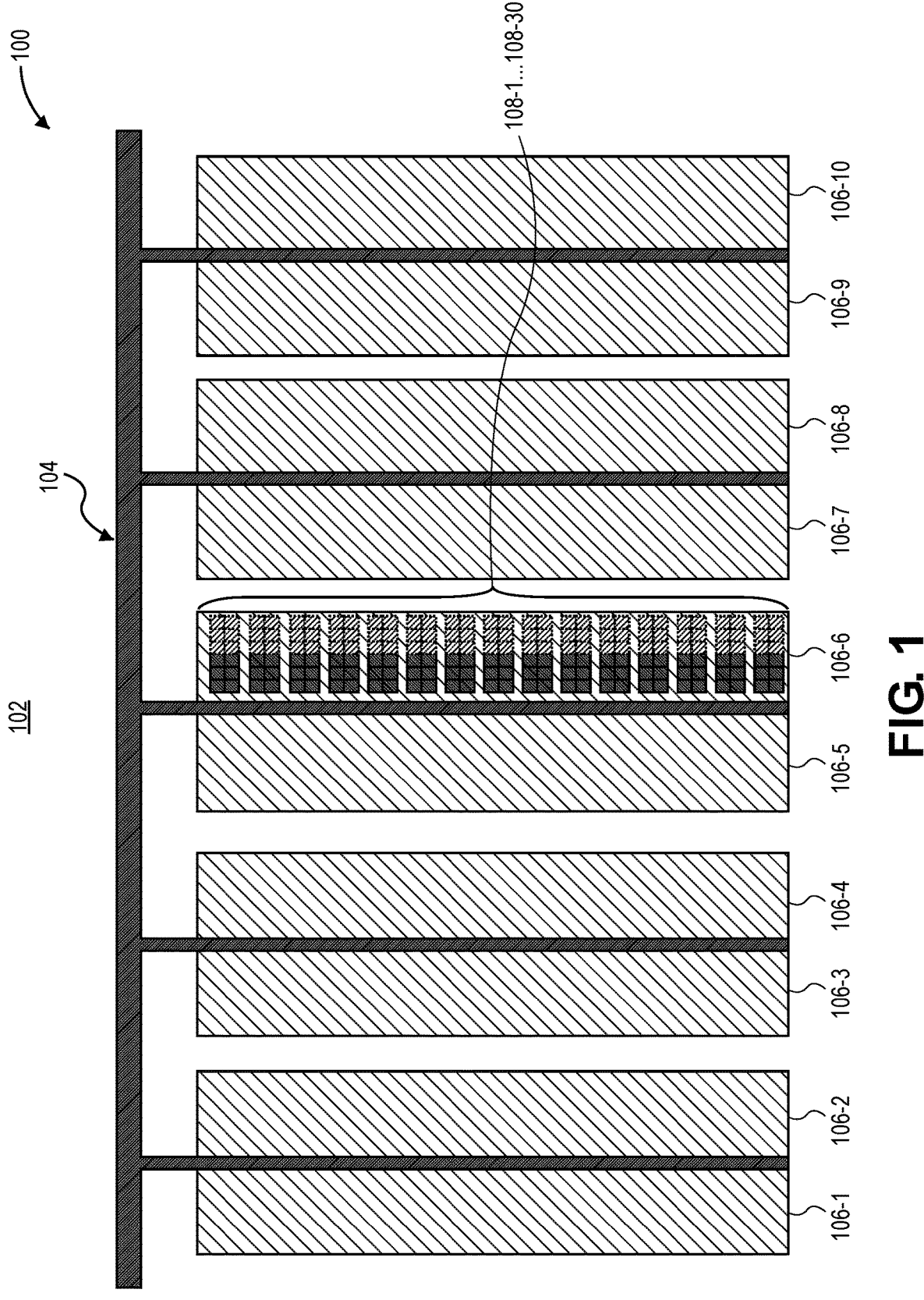
FIG. 1 is a schematic, top-down view diagram of an example package storage space layout, in accordance with implementations of the present disclosure.

As is set forth in greater detail below, implementations of the present disclosure are directed to package storage space optimization systems and methods for delivery facilities or other material handling facilities, including reconfigurable racks that may be utilized to enable storage space optimization.

In example embodiments, delivery facilities may include various storage space layouts to facilitate sorting, accumulation, and delivery of packages to various customers or other destinations. The packages to be sorted, accumulated, and delivered may comprise at least two types of packages, e.g., a first type of packages that fit within standardized containers, and a second type of packages that generally do not fit within standardized containers. As a result, storage space or racks within delivery facilities may generally include two types of racks, e.g., a first type having a standardized package configuration to receive standardized containers containing the first type of packages, and a second type having a non-standardized package configuration to receive the second type of packages.

In addition, in order to enable flexibility and reconfiguration of the various storage space layouts, a third type of storage space or racks may be used, e.g., reconfigurable racks. In some examples, the reconfigurable racks may be reconfigurable between a standardized package configuration and a non-standardized package configuration. In other examples, at least a portion of the reconfigurable racks may be reconfigurable between a standardized package configuration and a non-standardized package configuration.

In example embodiments, the reconfigurable racks may have various structures, controllers, actuators, sensors, or other components. For example, the reconfigurable racks may have extending or retracting rotatable shelves, hanging shelves, telescoping shelves, vertically translating shelves, combinations thereof, or various other example structures, controllers, actuators, sensors, or other components. In addition, the reconfigurable racks may be manually, semi-automatically, or substantially automatically reconfigured.

In further example embodiments, based on a package mix at a delivery facility, adjustment to reconfigurable racks within a storage space layout may be determined and/or instructed, e.g., via communication with portable devices, visual or audio alert devices, displays, or other presentation devices. In addition, adjustment to reconfigurable racks within a storage space layout may be at least partially automatically implemented, e.g., via commands, instructions, data, or other information transmitted between a control system and controllers, actuators, sensors, or other components of the reconfigurable racks.

As described herein, by using at least a small portion or percentage of reconfigurable racks within a storage space layout of a delivery facility, the reconfigurable racks may be flexibly reconfigured based on a current or expected package mix, thereby enabling accurate, efficient, and safe delivery processes.

FIG. 1 is a schematic, top-down view diagram 100 of an example package storage space layout, in accordance with implementations of the present disclosure.

As shown in FIG. 1, a portion of a delivery facility 102 may comprise various conveyance mechanisms 104 that sort and transport packages to various columns or clusters 106, and individual aisles 108 associated with each cluster 106. In the example embodiment illustrated in FIG. 1, the delivery facility 102 may include ten clusters 106-1, 106-2, 106-3, 106-4, 106-5, 106-6, 106-7, 106-8, 106-9, 106-10, and each cluster 106 may include thirty aisles 108-1 . . . 108-30.

The delivery facility 102 may receive packages from various other material handling facilities or other source or origination locations. In addition, the delivery facility 102 may sort the packages to individual aisles 108 based on their ultimate or final destinations. In some examples, each individual aisle 108 may be associated with one or more zip codes, regions, or other geographical areas having a plurality of geographically adjacent destination locations, and/or may be associated with one or more routes, customers, entities, or other logical groupings. Then, packages that have been sorted to an individual aisle 108 may be loaded or transferred to one or more trailers, delivery trucks, vans, or other types of transport vehicles for delivery to destination locations.

The conveyance mechanisms 104 may comprise various types of conveyors, slides, chutes, rails, pallet jacks, forklifts, automated guided vehicles, robotic drive units, and/or other types of manual, semi-automated, and/or automated conveyance mechanisms. The conveyance mechanisms 104 may sort and move packages to particular clusters 106 and then to corresponding aisles 108 of such clusters 106. At individual aisles 108, packages may be retrieved from the conveyance mechanisms 104 and placed or positioned within the aisles 108. Various manual, semi-automated, and/or automated systems or methods may be used to transfer packages from the conveyance mechanisms 104 to the aisles 108.

The aisles 108 may include a plurality of racks configured to receive packages, including standardized containers and non-standardized packages. For example, the plurality of racks may include a first type of racks having a standardized package configuration to receive standardized containers, a second type of racks having a non-standardized package configuration to receive non-standardized packages, and a third type of reconfigurable racks that may be reconfigured between standardized and non-standardized package configurations, as further described herein.

Although FIG. 1 illustrates a particular number, configuration, and arrangement of various components of a delivery facility, other example embodiments may include other numbers, configurations, or arrangements of components, such as different types, arrangements, or combinations of conveyance mechanisms, different numbers, configurations, or arrangements of columns or clusters, and/or different numbers, configurations, or arrangement of aisles, as well as different numbers, configurations, or arrangements of various types of racks within individual aisles.

Figure 2:
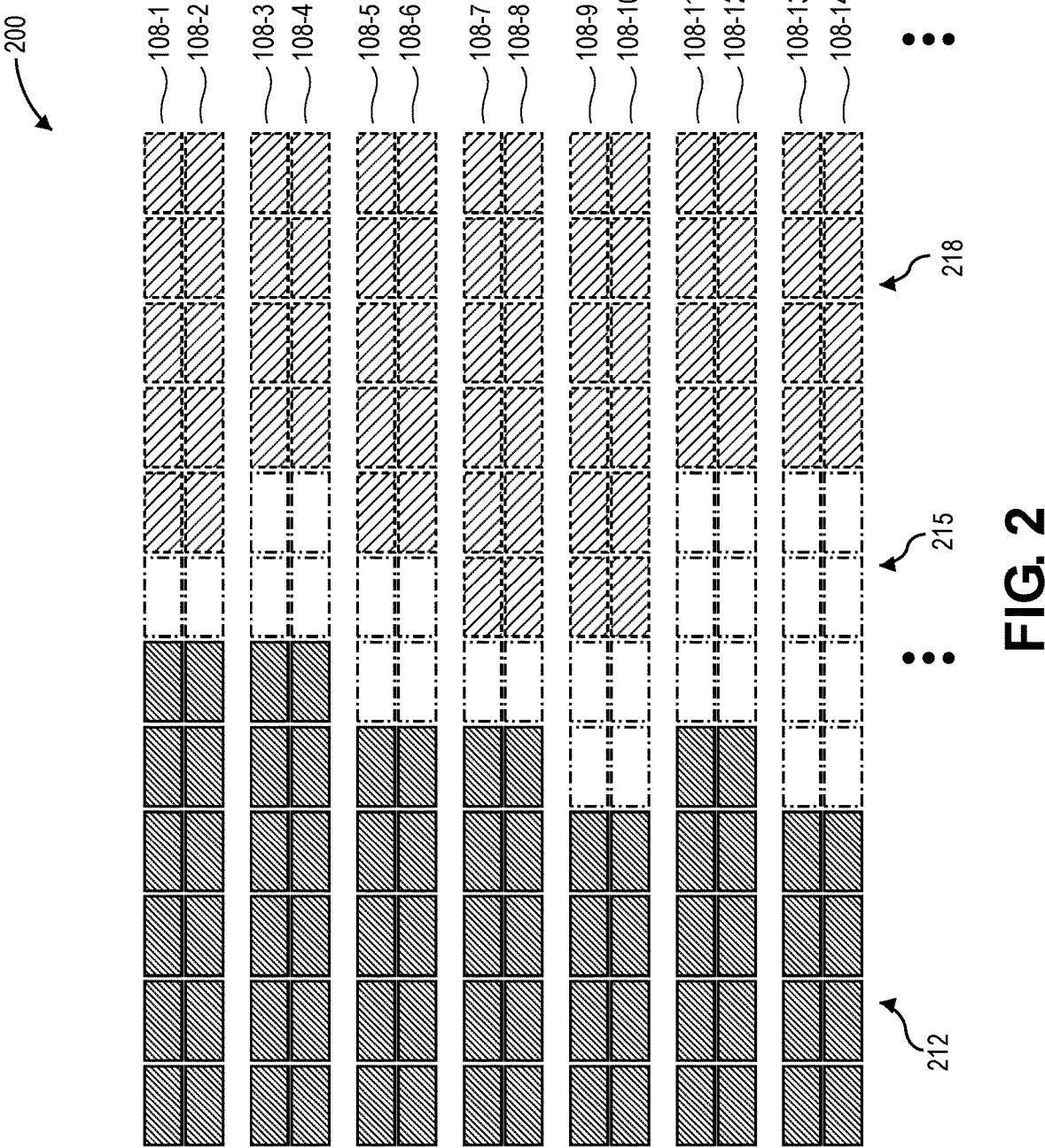
FIG. 2 is a schematic, top-down view diagram of various example package storage space layouts using reconfigurable racks, in accordance with implementations of the present disclosure.

FIG. 2 is a schematic, top-down view diagram 200 of various example package storage space layouts using reconfigurable racks, in accordance with implementations of the present disclosure.

As shown in FIG. 2, a plurality of aisles 108 may include various combinations of racks of a first type 212, racks of a second type 218, and racks of a third type 215, e.g., reconfigurable racks. In the example illustrated in FIG. 2, the plurality of aisles 108 may include fourteen or more aisles, e.g., 108-1, 108-2, 108-3, 108-4, 108-5, 108-6, 108-7, 108-8, 108-9, 108-10, 108-11, 108-12, 108-13, 108-14. In addition, each of the aisles 108 may include twelve or more individual racks. Further, the racks of the first type 212, e.g., illustrated with solid lines, may be fixed or predetermined to have a standardized package configuration, the racks of the second type 218, e.g., illustrated with dashed lines, may be fixed or predetermined to have a non-standardized package configuration, and the racks of the third, reconfigurable type 215, e.g., illustrated with dash-dot lines, may be reconfigurable between standardized and non-standardized package configurations.

Each of the types 212, 215, 218 of racks may generally have one or more tiers, levels, or shelves. In some examples, racks of the first type 212 and racks of the third type 215 that are configured in the standardized package configuration may generally have two, three, four, or more shelves. In additional examples, racks of the second type 218 and racks of the third type 215 that are configured in the non-standardized package configuration may generally have zero, one, or two shelves.

For racks that are configured or reconfigured in the standardized package configuration, various types of packages may be loaded or placed into standardized containers that may then be placed in the corresponding racks. The various types of packages that may be loaded or placed into standardized containers may include envelopes, pouches, bags, small boxes, or other packages having generally small dimensions or volumes. In addition, the standardized containers may comprise medium or large sized boxes, crates, totes, or containers configured to be loaded into shelves of racks in the standardized package configuration. For example, individual standardized containers may have a volume of approximately 7-8 cubic feet. Other examples may use other sizes of standardized containers and associated packages to be loaded therein, in which the standardized containers may be loaded into racks that are configured in standardized package configurations.

For racks that are configured or reconfigured in the non-standardized package configuration, various types of packages may be loaded or placed into the corresponding racks. The various types of packages that may be loaded or placed into racks in non-standardized package configuration may include boxes or packages having generally larger, taller, or bulkier dimensions or volumes. For example, individual larger, taller, or bulkier packages may have a volume of approximately 2 cubic feet or greater and/or one or more dimensions that are greater than approximately 2-3 feet. Other examples may include other sizes of larger, taller, or bulkier packages to be loaded into racks that are configured in non-standardized package configurations.

In contrast to the example storage space layouts described herein, conventional package storage space layouts that include only fixed or predetermined racks that are configured in only a standardized package configuration, e.g., racks of the first type 212, or only a non-standardized package configuration, e.g., rack of the second type 218, may be unable to handle changes to package mix, and/or uneven package mix. For example, if a majority of packages that are sorted to an aisle are standardized packages, and if there is a fixed, approximately equal number of racks with standardized and non-standardized package configurations, any overflow or surplus of standardized packages that cannot be loaded and placed into standardized containers and corresponding racks may have to be placed or positioned at other locations, such as along walkways, at outer edges or peripheries of the aisle, on the floor, and/or other unplanned locations. Likewise, if a majority of packages that are sorted to an aisle are non-standardized packages, and if there is a fixed, approximately equal number of racks with standardized and non-standardized package configurations, any overflow or surplus of non-standardized packages that cannot be loaded and placed into corresponding racks may have to be placed or positioned at other locations, such as along walkways, at outer edges or peripheries of the aisle, on the floor, and/or other unplanned locations.

Such placement of standardized containers or non-standardized packages at unplanned locations may lead to errors or mistakes during sorting, as well as during loading and transport to destination locations. In addition, the overflow or surplus of packages of a certain type may increase the time required to sort and store the packages to the aisle, as well as increase the time required to later find and retrieve packages from the aisle for loading and transport. Moreover, the placement of standardized containers or non-standardized packages at unplanned locations may create hazardous or unsafe work conditions, such as tripping hazards, fall hazards, visibility problems, ergonomic issues, or other potential issues.

In example embodiments of storage space layouts as described herein, at least some of the racks utilized in at least some of the aisles 108 of a delivery facility may include racks of the third, reconfigurable type 215, e.g., reconfigurable racks. For example, racks of the third type 215 may be reconfigured as desired between the standardized package configuration or the non-standardized package configuration. In other examples, some racks of the third type 215 may be only partially reconfigurable between the standardized package configuration or the non-standardized package configuration. Thus, the racks of the third type 215, e.g., reconfigurable racks, may provide flexibility to receive more or less of either standardized containers or non-standardized packages within respective aisles over time.

Further, the racks of the third type 215 may be reconfigured as needed on a shift basis, on a daily basis, on a weekly basis, on a monthly basis, on a seasonal basis, during holidays, or otherwise as frequently or infrequently as needed. For example, a delivery facility may experience daily, monthly, and/or seasonal changes to package mix based on demand from customers or others. In response to such changes to package mix, racks of the third type 215 may be reconfigured to meet such changes and provide sufficient and appropriate storage space within respective aisles for the expected package mix.

Moreover, by providing sufficient and appropriate storage space with racks of the third, reconfigurable type 215, errors or mistakes associated with sorting, retrieval, loading, and transport of packages may be reduced, efficiency and ergonomics associated with such processes may be improved, and hazardous or unsafe work conditions may be substantially minimized.

Generally, because individual aisles 108 may be associated with one or more zip codes, regions, geographical areas, routes, customers, or entities, the respective regions, routes, or entities and corresponding aisles 108 that may experience a greater variation or change to the expected package mix, e.g., over days, weeks, seasons, holidays, etc., may include a greater number of racks of the third, reconfigurable type 215. For example, as shown in FIG. 2, aisles 108-13 and 108-14 each include four reconfigurable racks compared to aisles 108-1, 108-2, 108-7, and 108-8 that each include one reconfigurable rack, which may indicate that the regions, routes, or entities associated with aisles 108-13 and 108-14 may experience a greater variation or change to the expected package mix over time as compared to the regions, routes, or entities associated with aisles 108-1, 108-2, 108-7, and 108-8.

In addition, the proportion of fixed racks of the first type 212 to fixed racks of the second type 218 may also indicate a particular package mix over time for respective regions, routes, or entities associated with the aisles 108. For example, as shown in FIG. 2, aisles 108-3 and 108-4 may include a greater proportion of racks of the first type 212 over racks of the second type 218 compared to aisles 108-9 and 108-10 that may include a greater proportion of racks of the second type 218 over racks of the first type 212, which may indicate that the regions, routes, or entities associated with aisles 108-3 and 108-4 may generally have a greater proportion of standardized packages over non-standardized packages over time as compared to the regions, routes, or entities associated with aisles 108-9 and 108-10 that may generally have a greater proportion of non-standardized packages over standardized packages over time.

As illustrated in FIG. 2, various numbers of racks of the third, reconfigurable type 215 may be utilized in respective aisles 108, e.g., zero, one, two, three, or other numbers of reconfigurable racks. In addition, the racks of the third type 215 may generally be positioned between racks of the first type 212 and racks of the second type 218. In this manner, when any racks of the third type 215 may be reconfigured between the standardized package configuration and the non-standardized package configuration, such reconfigured racks may still be positioned adjacent to other racks having similar standardized or non-standardized package configurations. For example, this may avoid, reduce, or minimize the logical disconnect, added time, and/or loss of efficiency of having one or more racks in either the standardized or non-standardized package configurations at locations separated from other racks having the same package configurations, e.g., positioned at opposite ends of an aisle.

Although FIG. 2 illustrates a particular number, configuration, and arrangement of various racks within aisles, other example embodiments may include different numbers, configurations, or arrangement of aisles, and/or other configurations or arrangements of racks, such as different types, numbers, or combinations of racks of various types. Further, although FIG. 2 illustrates adjacent pairs of aisles, e.g., aisles 108-1 and 108-2, as having a same number of reconfigurable racks of the third type 215, other example embodiments may include adjacent aisles with different numbers of reconfigurable racks of the third type 215, e.g., aisle 108-1 may include one reconfigurable rack and aisle 108-2 may include three reconfigurable racks.

Furthermore, the number of reconfigurable racks, e.g., racks of the third type 215, that may be used or incorporated into one or more aisles of a delivery facility may be determined using various stochastic optimization models, mixed integer linear programming models, or other similar optimization models, techniques, or algorithms. Various inputs and constraints may be provided to such models, and one or more outputs, including a number of reconfigurable racks, may be generated by such models.

For example, for applications such as designing, developing, or configuring new delivery facilities with package storage space layouts utilizing a combination of fixed racks having standardized package configurations, fixed racks having non-standardized package configurations, and reconfigurable racks, the inputs may comprise an expected volume or mix of standardized packages and non-standardized packages. In addition, the constraints may include a number of fixed racks having standardized package configurations and/or a number of fixed racks having non-standardized package configurations. Then, based on such inputs and constraints, the optimization models may provide as outputs a number of reconfigurable racks, e.g., a minimum number of reconfigurable racks, desired rack configurations for individual aisles, and an overall maximum capacity of individual aisles of the delivery facility. In this regard, the objective function associated with such new applications may be a minimum number of reconfigurable racks to design, develop, or configure a new delivery facility and associated package storage space layout.

In addition, for applications such as retrofitting, redesigning, or reconfiguring existing delivery facilities with package storage space layouts utilizing a combination of fixed racks having standardized package configurations, fixed racks having non-standardized package configurations, and reconfigurable racks, the inputs may again comprise an expected volume or mix of standardized packages and non-standardized packages. In addition, the constraints may include a number of fixed racks having standardized package configurations, a number of fixed racks having non-standardized package configurations, and/or an overall maximum capacity of individual aisles of the delivery facility, which may have physical limits or constraints in existing delivery facilities. Then, based on such inputs and constraints, the optimization models may provide as outputs a number of reconfigurable racks, e.g., a minimum number of reconfigurable racks, and desired rack configurations for individual aisles. In this regard, the objective function associated with such retrofit applications may be a minimum number of reconfigurable racks to retrofit, redesign, or reconfigure an existing delivery facility and associated package storage space layout.

Figure 3B:
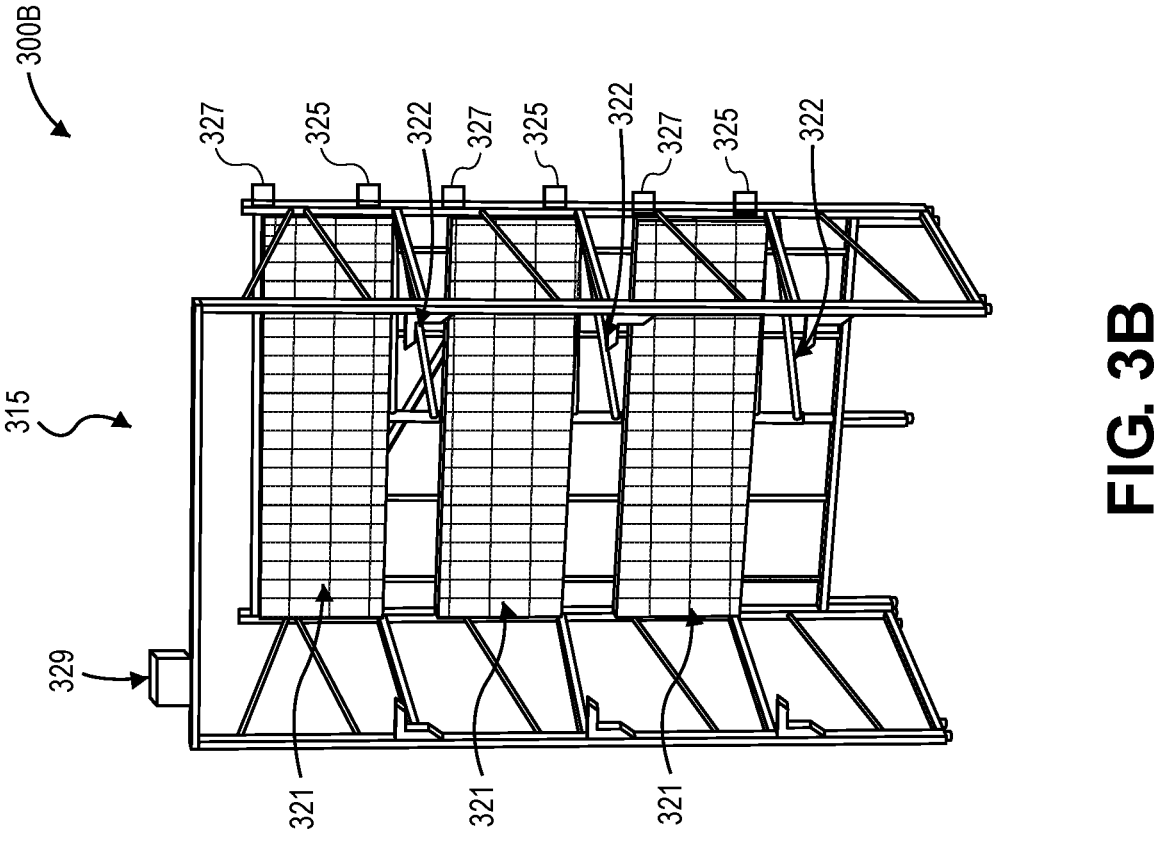
FIG. 3B is a schematic, front perspective view diagram of the first example reconfigurable rack in a non-standardized package configuration, in accordance with implementations of the present disclosure.
Figure 3A:
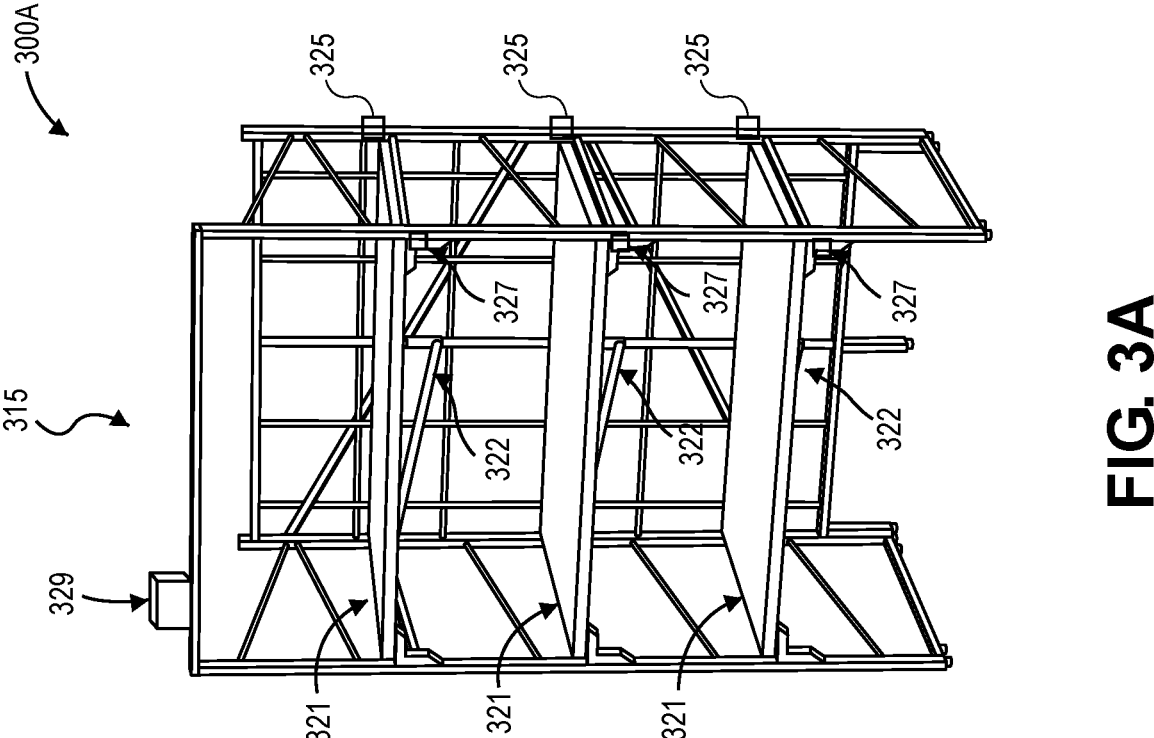
FIG. 3A is a schematic, front perspective view diagram of a first example reconfigurable rack in a standardized package configuration, in accordance with implementations of the present disclosure.

FIG. 3A is a schematic, front perspective view diagram 300A of a first example reconfigurable rack in a standardized package configuration, in accordance with implementations of the present disclosure. FIG. 3B is a schematic, front perspective view diagram 300B of the first example reconfigurable rack in a non-standardized package configuration, in accordance with implementations of the present disclosure.

As shown in FIGS. 3A and 3B, a first example reconfigurable rack 315 may comprise a frame or structure including a plurality of shelves 321 that may be supported by support arms 322. In addition, the first reconfigurable rack 315 may include various actuators 325, sensors 327, and a controller 329.

The frame or structure may comprise a plurality of beams, columns, rods, plates, brackets, fasteners, or other structural elements formed to delineate a space or volume to receive various standardized containers and/or non-standardized packages. In addition, the frame or structure, the shelves 321, the support arms 322, and/or other components may be formed of metals, plastics, composites, natural materials, or combinations thereof.

The plurality of shelves 321 and the plurality of support arms 322 may be hingedly, pivotably, or rotatably coupled to portions of the frame. For example, as shown in FIG. 3A, the shelves 321 may be rotated to extended positions, and the support arms 322 may also be rotated or pivoted to support the shelves 321. In addition, as shown in FIG. 3B, the shelves 321 may be rotated to retracted positions, e.g., upwards and towards the back of the frame, and the support arms 322 may also be rotated or pivoted to retracted positions, e.g., towards a side and back of the frame.

In some example embodiments, the plurality of shelves 321 and support arms 322 may be substantially manually operated or moved, in order to reconfigure the first example reconfigurable rack 315 between the standardized package configuration, as shown in FIG. 3A, and the non-standardized package configuration, as shown in FIG. 3B. In some examples, the manual operation or reconfiguration may be performed by use of levers, cranks, slides, or other similar mechanical inputs or controls.

In other example embodiments, the first example reconfigurable rack 315 may be reconfigured semi-automatically or automatically between the standardized package configuration, as shown in FIG. 3A, and the non-standardized package configuration, as shown in FIG. 3B. In such examples, the first example reconfigurable rack 315 may include a plurality of motors 325, a plurality of sensors 327, and/or a controller 329.

The plurality of motors 325 may be coupled to movable portions of the shelves 321. e.g., at or near rotatable, pivotable, or hinged joints or connections of the shelves 321 to the frame. In addition, the plurality of motors 325, or additional motors, may be coupled to movable portions of the support arms 322, e.g., at or near rotatable, pivotable, or hinged joints or connections of the support arms 322 to the frame. The plurality of motors 325, or additional motors, may comprise various types of motors, servos, solenoids, linear actuators, pneumatic actuators, geared mechanisms, or other types of actuators, and the plurality of motors 325, or additional motors, may be actuated by use of buttons, switches, knobs, touchscreens, other control inputs, or other electromechanical inputs or devices.

By actuation of the plurality of motors 325 and/or additional motors, the shelves 321 may be moved between extended positions, as shown in FIG. 3A, and retracted positions, as shown in FIG. 3B. Likewise, the support arms 322 may be moved between extended positions, as shown in FIG. 3A, and retracted positions, as shown in FIG. 3B.

The plurality of sensors 327 may be coupled to portions of the frame and/or portions of the shelves 321 and/or support arms 322. The plurality of sensors 327 may be configured to detect particular positions of the shelves 321 and/or support arms 322 that may be associated with the standardized package configuration or the non-standardized package configuration. The plurality of sensors 327 may comprise various types of motor encoders, photoeyes, contact sensors, proximity sensors, or other types of sensors.

By receiving and processing data from the plurality of sensors 327, positions of the shelves 321 and/or support arms 322 may be detected or determined between extended positions, as shown in FIG. 3A, and retracted positions, as shown in FIG. 3B.

The controller 329 may comprise a processor, memory, communication device, visual display device, audio output device, and/or various input controls or devices. For example, the controller 329 may be in communication with the plurality of motors 325 and the plurality of sensors 327, in order to send and receive data and/or instructions with the motors 325 and sensors 327. The visual display device may comprise various types of screens, monitors, displays, touchscreens, lights, or other visual presentation or emission elements, and the audio output device may comprise various types of speakers, alarms, horns, or other sound output elements. Further, the various input controls or devices may comprise touchscreens, buttons, switches, knobs, micro-phones, or other types of input devices.

The controller 329 may also be in communication with a control system that may determine desired configurations of reconfigurable racks within a delivery facility, e.g., based on expected package mix or volume. Further details of a control system are described herein at least with respect to FIG. 10.

The controller 329 may receive data or instructions from a control system related to a desired configuration of an example reconfigurable rack 315. Based on the received data, the controller 329 may cause presentation of visual and/or audio information, via the visual display device and/or the audio output device, related to the desired con-figuration, e.g., instructions or information to assist agents in reconfiguring the reconfigurable rack. In addition, the con-troller 329 may also cause emission of visual and/or audio alerts, via the visual display device and/or the audio output device, related to the desired configuration, e.g., alerts or alarms to call agents' attention to reconfiguring the recon-figurable rack. Further, the controller 329 may stop causing presentation or emission of visual and/or audio information or alerts in response to determining that the reconfigurable rack has been adjusted to the desired configuration. In some examples, the controller 329 and/or the control system may also communicate with portable communication devices used by agents, and may provide information and/or alerts related to the desired configuration to such portable devices.

In further examples, based on the received data, the controller 329 may transmit instructions to the plurality of motors 325 to substantially automatically move or adjust the plurality of shelves 321 and/or support arms 322 to a desired configuration. In addition, the controller 329 may receive data from the plurality of sensors 327 to detect current positions of the shelves 321 and/or support arms 322, in order to determine whether to instruct movement or adjust-ment of the shelves 321 and/or support arms 322, as well as to determine whether the movement or adjustment to the desired configuration is complete. Further, the controller 329 may stop transmitting instructions to the motors 325 and/or stop receiving data from the sensors 327 in response to determining that the reconfigurable rack has been adjusted to the desired configuration.

In the example of FIGS. 3A and 3B, the standardized package configuration of the reconfigurable rack 315 in FIG. 3A may be able to receive eight standardized containers that contain standardized packages, e.g., two standardized con-tainers on each shelf 321 or level. In addition, the non-standardized package configuration of the reconfigurable rack 315 in FIG. 3B may be able to receive various types and sizes of non-standardized packages, e.g., various large, tall, or bulky packages.

Figures 4A, 4B:
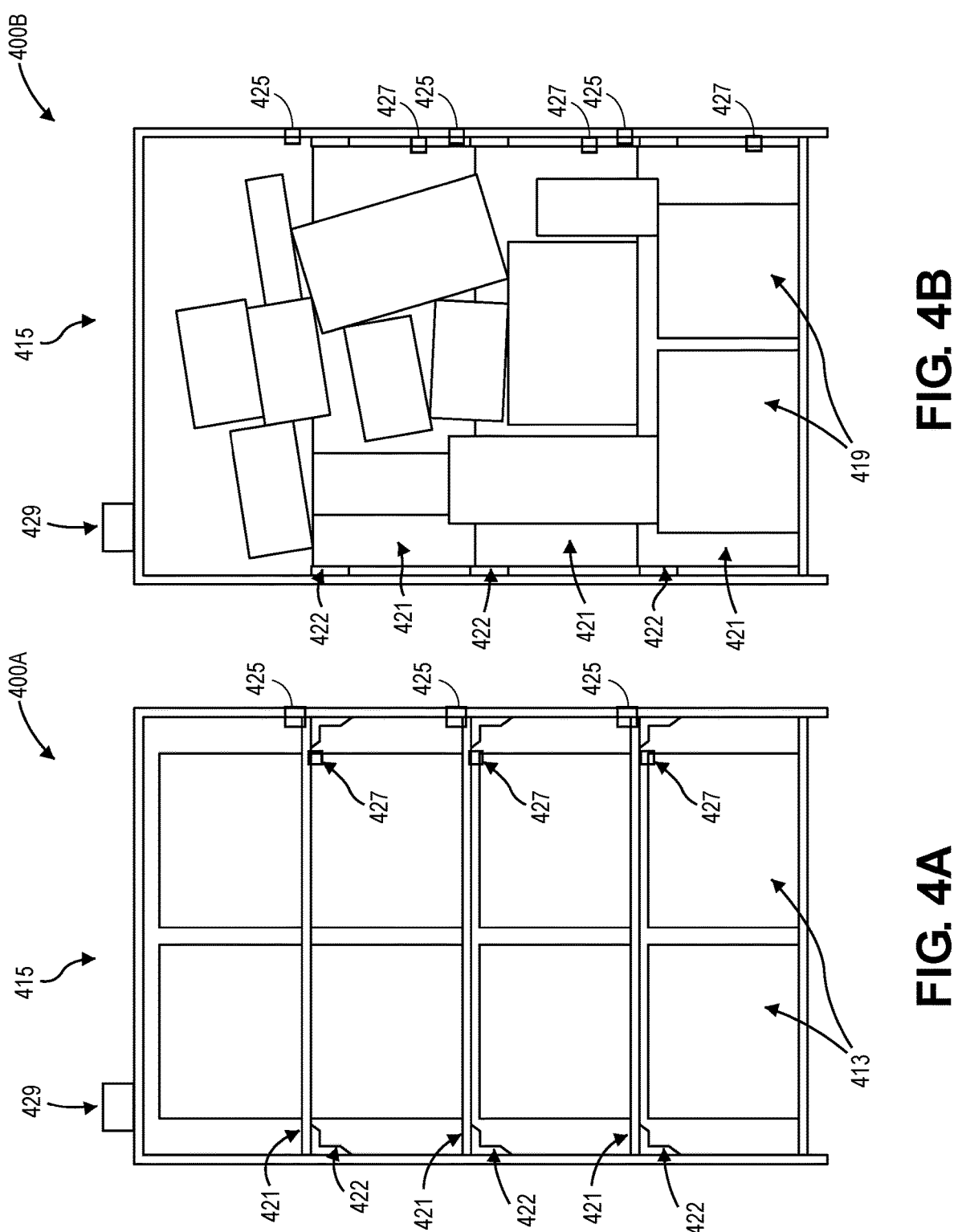
FIG. 4A is a schematic, front view diagram of a second example reconfigurable rack in a standardized package configuration, in accordance with implementations of the present disclosure.
FIG. 4B is a schematic, front view diagram of the second example reconfigurable rack in a non-standardized package configuration, in accordance with implementations of the present disclosure.

FIG. 4A is a schematic, front view diagram 400A of a second example reconfigurable rack in a standardized pack-age configuration, in accordance with implementations of the present disclosure. FIG. 4B is a schematic, front view diagram 400B of the second example reconfigurable rack in a non-standardized package configuration, in accordance with implementations of the present disclosure.

As shown in FIGS. 4A and 4B, a second example recon-figurable rack 415 may comprise a frame or structure including a plurality of shelves 421 that may be supported by side support arms 422. In addition, the second reconfigur-able rack 415 may include various actuators 425, sensors 427, and a controller 429.

The frame or structure may comprise a plurality of beams, columns, rods, plates, brackets, fasteners, or other structural elements formed to delineate a space or volume to receive various standardized containers and/or non-standardized packages. In addition, the frame or structure, the shelves 421, the side support arms 422, and/or other components may be formed of metals, plastics, composites, natural materials, or combinations thereof.

The plurality of shelves 421 and the plurality of side support arms 422 may be hingedly, pivotably, or rotatably coupled to portions of the frame. For example, as shown in FIG. 4A, the shelves 421 may be rotated to extended positions, and the side support arms 422 may also be rotated or pivoted to support the shelves 421. In addition, as shown in FIG. 4B, the shelves 421 may be rotated to retracted positions, e.g., downwards and towards the back of the frame, and the side support arms 422 may also be rotated or pivoted to retracted positions, e.g., towards respective sides of the frame.

In some example embodiments, the plurality of shelves 421 and side support arms 422 may be substantially manu-ally operated or moved, in order to reconfigure the second example reconfigurable rack 415 between the standardized package configuration, as shown in FIG. 4A, and the non-standardized package configuration, as shown in FIG. 4B. In some examples, the manual operation or reconfiguration may be performed by use of levers, cranks, slides, or other similar mechanical inputs or controls.

In other example embodiments, the second example reconfigurable rack 415 may be reconfigured semi-automati-cally or automatically between the standardized package configuration, as shown in FIG. 4A, and the non-standard-ized package configuration, as shown in FIG. 4B. In such examples, the second example reconfigurable rack 415 may include a plurality of motors 425, a plurality of sensors 427, and/or a controller 429.

The plurality of motors 425 may be coupled to movable portions of the shelves 421. e.g., at or near rotatable, pivotable, or hinged joints or connections of the shelves 421 to the frame. In addition, the plurality of motors 425, or additional motors, may be coupled to movable portions of the side support arms 422, e.g., at or near rotatable, pivot-able, or hinged joints or connections of the side support arms 422 to the frame. The plurality of motors 425, or additional motors, may comprise various types of motors, servos, solenoids, linear actuators, pneumatic actuators, geared mechanisms, or other types of actuators, and the plurality of motors 425, or additional motors, may be actuated by use of buttons, switches, knobs, touchscreens, other control inputs, or other electromechanical inputs or devices.

By actuation of the plurality of motors 425 and/or addi-tional motors, the shelves 421 may be moved between extended positions, as shown in FIG. 4A, and retracted positions, as shown in FIG. 4B. Likewise, the side support arms 422 may be moved between extended positions, as shown in FIG. 4A, and retracted positions, as shown in FIG. 4B.

The plurality of sensors 427 may be coupled to portions of the frame and/or portions of the shelves 421 and/or side support arms 422. The plurality of sensors 427 may be configured to detect particular positions of the shelves 421 and/or side support arms 422 that may be associated with the standardized package configuration or the non-standardized package configuration. The plurality of sensors 427 may comprise various types of motor encoders, photoeyes, con-tact sensors, proximity sensors, or other types of sensors.

By receiving and processing data from the plurality of sensors 427, positions of the shelves 421 and/or side support arms 422 may be detected or determined between extended positions, as shown in FIG. 4A, and retracted positions, as shown in FIG. 4B.

The controller 429 may comprise a processor, memory, communication device, visual display device, audio output device, and/or various input controls or devices. For example, the controller 429 may be in communication with the plurality of motors 425 and the plurality of sensors 427, in order to send and receive data and/or instructions with the motors 425 and sensors 427. The visual display device may comprise various types of screens, monitors, displays, touchscreens, lights, or other visual presentation or emission elements, and the audio output device may comprise various types of speakers, alarms, horns, or other sound output elements. Further, the various input controls or devices may comprise touchscreens, buttons, switches, knobs, microphones, or other types of input devices.

The controller 429 may also be in communication with a control system that may determine desired configurations of reconfigurable racks within a delivery facility, e.g., based on expected package mix or volume. Further details of a control system are described herein at least with respect to FIG. 10.

The controller 429 may receive data or instructions from a control system related to a desired configuration of an example reconfigurable rack 415. Based on the received data, the controller 429 may cause presentation of visual and/or audio information, via the visual display device and/or the audio output device, related to the desired configuration, e.g., instructions or information to assist agents in reconfiguring the reconfigurable rack. In addition, the controller 429 may also cause emission of visual and/or audio alerts, via the visual display device and/or the audio output device, related to the desired configuration, e.g., alerts or alarms to call agents' attention to reconfiguring the reconfigurable rack. Further, the controller 429 may stop causing presentation or emission of visual and/or audio information or alerts in response to determining that the reconfigurable rack has been adjusted to the desired configuration. In some examples, the controller 429 and/or the control system may also communicate with portable communication devices used by agents, and may provide information and/or alerts related to the desired configuration to such portable devices.

In further examples, based on the received data, the controller 429 may transmit instructions to the plurality of motors 425 to substantially automatically move or adjust the plurality of shelves 421 and/or side support arms 422 to a desired configuration. In addition, the controller 429 may receive data from the plurality of sensors 427 to detect current positions of the shelves 421 and/or side support arms 422, in order to determine whether to instruct movement or adjustment of the shelves 421 and/or side support arms 422, as well as to determine whether the movement or adjustment to the desired configuration is complete. Further, the controller 429 may stop transmitting instructions to the motors 425 and/or stop receiving data from the sensors 427 in response to determining that the reconfigurable rack has been adjusted to the desired configuration.

In the example of FIGS. 4A and 4B, the standardized package configuration of the reconfigurable rack 415 in FIG. 4A may be able to receive eight standardized containers 413 that contain standardized packages, e.g., two standardized containers 413 on each shelf 421 or level. In addition, the non-standardized package configuration of the reconfigurable rack 415 in FIG. 4B may be able to receive various types and sizes of non-standardized packages 419, e.g., various large, tall, or bulky packages.

Figures 5A, 5B:
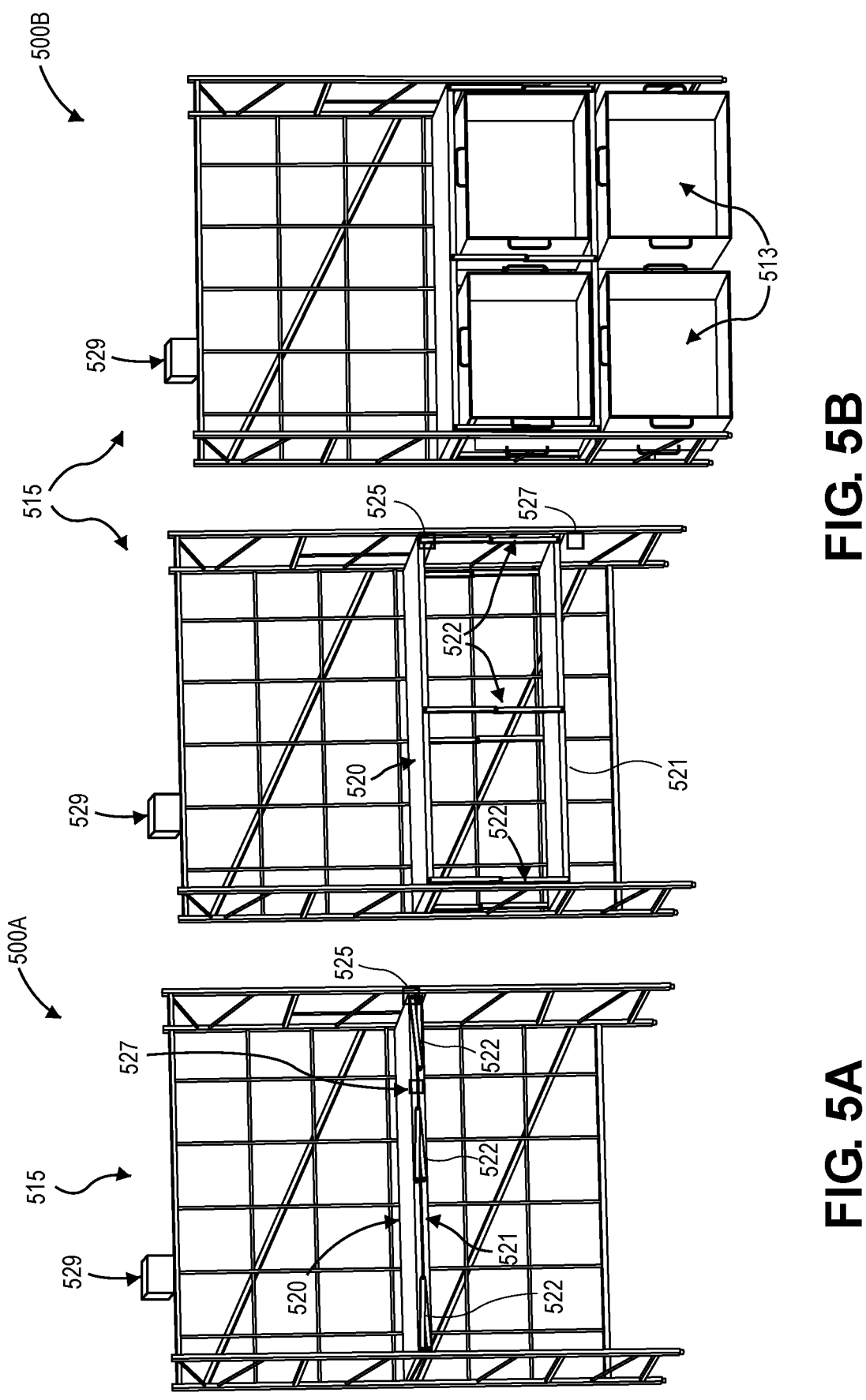
FIG. 5A is a schematic, front perspective view diagram of a third example reconfigurable rack in a non-standardized package configuration, in accordance with implementations of the present disclosure.
FIG. 5B are schematic, front perspective view diagrams of the third example reconfigurable rack in a partial, standardized package configuration, in accordance with implementations of the present disclosure.

FIG. 5A is a schematic, front perspective view diagram 500A of a third example reconfigurable rack in a non-standardized package configuration, in accordance with implementations of the present disclosure. FIG. 5B are schematic, front perspective view diagrams 500B of the third example reconfigurable rack in a partial, standardized package configuration, in accordance with implementations of the present disclosure.

As shown in FIGS. 5A and 5B, a third example reconfigurable rack 515 may comprise a frame or structure including a static shelf 520, and a reconfigurable shelf 521 that may be moved between extended or retracted positions. In addition, the third reconfigurable rack 515 may include various actuators 525, sensors 527, and a controller 529.

The frame or structure may comprise a plurality of beams, columns, rods, plates, brackets, fasteners, or other structural elements formed to delineate a space or volume to receive various standardized containers and/or non-standardized packages. In addition, the frame or structure, the static shelf 520, the reconfigurable shelf 521, and/or other components may be formed of metals, plastics, composites, natural materials, or combinations thereof.

The reconfigurable shelf 521 may be movably coupled to portions of the frame and/or the static shelf 520 via one or more linkages, scissor arms, or other extendible/retractable links 522. For example, as shown in FIG. 5A, the shelf 521 may be moved to a retracted position, e.g., directly underneath the static shelf 520, by retracting, pivoting, or shortening the linkages 522. In addition, as shown in the left side of FIG. 5B, the shelf 521 may be moved to an extended position by extending, pivoting, or lengthening the linkages 522.

In some example embodiments, the reconfigurable shelf 521 and linkages 522 may be substantially manually operated or moved, in order to reconfigure the third example reconfigurable rack 515 between the non-standardized package configuration, as shown in FIG. 5A, and the partial, standardized package configuration, as shown in FIG. 5B. In some examples, the manual operation or reconfiguration may be performed by use of levers, cranks, slides, or other similar mechanical inputs or controls.

In other example embodiments, the third example reconfigurable rack 515 may be reconfigured semi-automatically or automatically between the non-standardized package configuration, as shown in FIG. 5A, and the partial, standardized package configuration, as shown in FIG. 5B. In such examples, the third example reconfigurable rack 515 may include a plurality of motors 525, a plurality of sensors 527, and/or a controller 529.

The plurality of motors 525 may be coupled to movable portions of the reconfigurable shelf 521 and/or one or more linkages 522, e.g., at or near extendible, pivotable, or movable joints or connections of the reconfigurable shelf 521 and/or linkages 522 to the frame and/or static shelf 520. The plurality of motors 525 may comprise various types of motors, servos, solenoids, linear actuators, pneumatic actuators, geared mechanisms, or other types of actuators, and the plurality of motors 525 may be actuated by use of buttons, switches, knobs, touchscreens, other control inputs, or other electromechanical inputs or devices.

By actuation of the plurality of motors 525, the reconfigurable shelf 521 may be moved between a retracted position, as shown in FIG. 5A, and an extended position, as shown in FIG. 5B.

The plurality of sensors 527 may be coupled to portions of the frame, static shelf 520, and/or portions of the reconfigurable shelf 521 and/or linkages 522. The plurality of sensors 527 may be configured to detect particular positions of the shelf 521 and/or linkages 522 that may be associated with the non-standardized package configuration or the partial, standardized package configuration. The plurality of sensors 527 may comprise various types of motor encoders, photoeyes, contact sensors, proximity sensors, or other types of sensors.

By receiving and processing data from the plurality of sensors 527, positions of the shelf 521 and/or linkages 522 may be detected or determined between the retracted position, as shown in FIG. 5A, and the extended position, as shown in FIG. 5B.

The controller 529 may comprise a processor, memory, communication device, visual display device, audio output device, and/or various input controls or devices. For example, the controller 529 may be in communication with the plurality of motors 525 and the plurality of sensors 527, in order to send and receive data and/or instructions with the motors 525 and sensors 527. The visual display device may comprise various types of screens, monitors, displays, touchscreens, lights, or other visual presentation or emission elements, and the audio output device may comprise various types of speakers, alarms, horns, or other sound output elements. Further, the various input controls or devices may comprise touchscreens, buttons, switches, knobs, microphones, or other types of input devices.

The controller 529 may also be in communication with a control system that may determine desired configurations of reconfigurable racks within a delivery facility, e.g., based on expected package mix or volume. Further details of a control system are described herein at least with respect to FIG. 10.

The controller 529 may receive data or instructions from a control system related to a desired configuration of an example reconfigurable rack 515. Based on the received data, the controller 529 may cause presentation of visual and/or audio information, via the visual display device and/or the audio output device, related to the desired configuration, e.g., instructions or information to assist agents in reconfiguring the reconfigurable rack. In addition, the controller 529 may also cause emission of visual and/or audio alerts, via the visual display device and/or the audio output device, related to the desired configuration, e.g., alerts or alarms to call agents' attention to reconfiguring the reconfigurable rack. Further, the controller 529 may stop causing presentation or emission of visual and/or audio information or alerts in response to determining that the reconfigurable rack has been adjusted to the desired configuration. In some examples, the controller 529 and/or the control system may also communicate with portable communication devices used by agents, and may provide information and/or alerts related to the desired configuration to such portable devices.

In further examples, based on the received data, the controller 529 may transmit instructions to the plurality of motors 525 to substantially automatically move or adjust the reconfigurable shelf 521 and/or linkages 522 to a desired configuration. In addition, the controller 529 may receive data from the plurality of sensors 527 to detect a current position of the shelf 521 and/or linkages 522, in order to determine whether to instruct movement or adjustment of the shelf 521 and/or linkages 522, as well as to determine whether the movement or adjustment to the desired configuration is complete. Further, the controller 529 may stop transmitting instructions to the motors 525 and/or stop receiving data from the sensors 527 in response to determining that the reconfigurable rack has been adjusted to the desired configuration.

In the example of FIGS. 5A and 5B, the non-standardized package configuration of the reconfigurable rack 515 in FIG. 5A may be able to receive various types and sizes of non-standardized packages, e.g., various large, tall, or bulky packages. In addition, the partial, standardized package configuration of the reconfigurable rack 515 in the right side of FIG. 5B may be able to receive four standardized containers 513 that contain standardized packages, e.g., two standardized containers 513 on the reconfigurable shelf 521 and two standardized containers 513 below the reconfigurable shelf 521, which may be on the frame of the rack 515 or on the floor within a footprint of the rack 515. Further, an upper portion, e.g., on or above the static shelf 520, of the partial, standardized package configuration of the reconfigurable rack 515 in the right side of FIG. 5B may also be able to receive various types and sizes of non-standardized packages, e.g., various large, tall, or bulky packages.

Figures 6A, 6B:
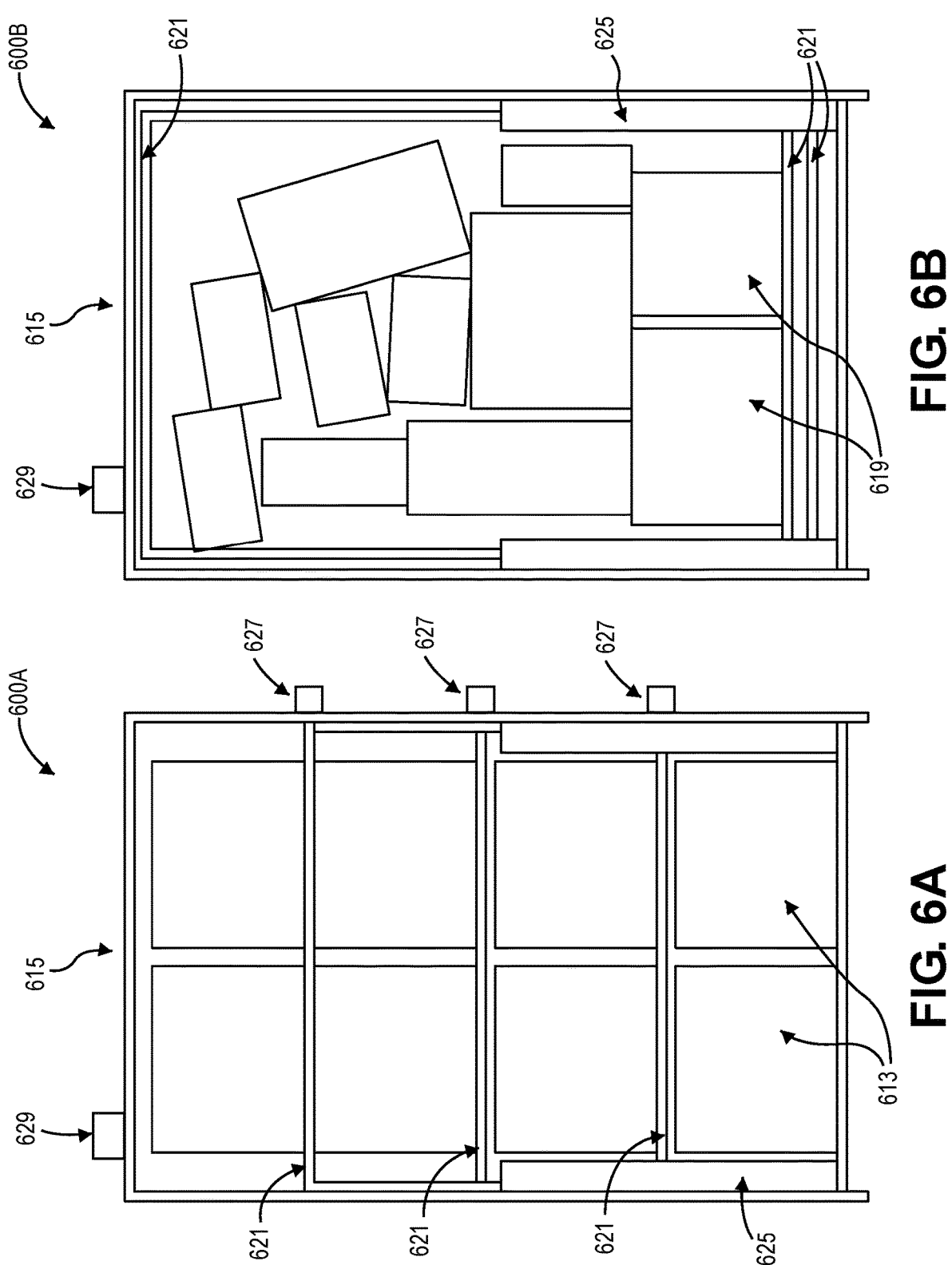
FIG. 6A is a schematic, front view diagram of a fourth example reconfigurable rack in a standardized package configuration, in accordance with implementations of the present disclosure.
FIG. 6B is a schematic, front view diagram of the fourth example reconfigurable rack in a non-standardized package configuration, in accordance with implementations of the present disclosure.

FIG. 6A is a schematic, front view diagram 600A of a fourth example reconfigurable rack in a standardized package configuration, in accordance with implementations of the present disclosure. FIG. 6B is a schematic, front view diagram 600B of the fourth example reconfigurable rack in a non-standardized package configuration, in accordance with implementations of the present disclosure.

As shown in FIGS. 6A and 6B, a fourth example reconfigurable rack 615 may comprise a frame or structure including a plurality of shelves 621 that may be telescopically moved between respective extended or retracted positions. In addition, the fourth reconfigurable rack 615 may include various actuators 625, sensors 627, and a controller 629.

The frame or structure may comprise a plurality of beams, columns, rods, plates, brackets, fasteners, or other structural elements formed to delineate a space or volume to receive various standardized containers and/or non-standardized packages. In addition, the frame or structure, the shelves 621, and/or other components may be formed of metals, plastics, composites, natural materials, or combinations thereof.

The plurality of shelves 621 may be movably coupled to portions of the frame. The plurality of shelves 621 may comprise platforms or pedestals that have telescoping members, arms, or legs associated with or coupled between sides of the platforms and the frame, and the telescoping members may be configured to allow translational movement, e.g., vertical movement, of the platforms along at least a portion of a height of the reconfigurable rack 615. For example, as shown in FIG. 6A, the shelves 621 may be telescopically moved to respective extended positions. In addition, as shown in FIG. 6B, the shelves 621 may be telescopically moved to respective retracted positions, e.g., downwards towards a base of the frame, and/or upwards towards a top of the frame.

In some example embodiments, the plurality of shelves 621 may be substantially manually operated or moved, in order to reconfigure the fourth example reconfigurable rack 615 between the standardized package configuration, as shown in FIG. 6A, and the non-standardized package configuration, as shown in FIG. 6B. In some examples, the manual operation or reconfiguration may be performed by use of levers, cranks, slides, or other similar mechanical inputs or controls.

In other example embodiments, the fourth example reconfigurable rack 615 may be reconfigured semi-automatically or automatically between the standardized package configuration, as shown in FIG. 6A, and the non-standardized package configuration, as shown in FIG. 6B. In such examples, the fourth example reconfigurable rack 615 may include a plurality of motors 625, a plurality of sensors 627, and/or a controller 629.

The plurality of motors 625 may be coupled to movable portions of the shelves 621. e.g., at or near movable, extendible, or retractable joints or connections of the shelves 621 to the frame. The plurality of motors 625 may comprise various types of motors, servos, solenoids, linear actuators, pneumatic actuators, geared mechanisms, or other types of actuators, and the plurality of motors 625 may be actuated by use of buttons, switches, knobs, touchscreens, other control inputs, or other electromechanical inputs or devices.

By actuation of the plurality of motors 625, the shelves 621 may be moved between respective extended positions, as shown in FIG. 6A, and respective retracted positions, as shown in FIG. 6B.

The plurality of sensors 627 may be coupled to portions of the frame and/or portions of the shelves 621. The plurality of sensors 627 may be configured to detect particular positions of the shelves 621 that may be associated with the standardized package configuration or the non-standardized package configuration. The plurality of sensors 627 may comprise various types of motor encoders, photoeyes, contact sensors, proximity sensors, or other types of sensors.

By receiving and processing data from the plurality of sensors 627, positions of the shelves 621 may be detected or determined between respective extended positions, as shown in FIG. 6A, and respective retracted positions, as shown in FIG. 6B.

The controller 629 may comprise a processor, memory, communication device, visual display device, audio output device, and/or various input controls or devices. For example, the controller 629 may be in communication with the plurality of motors 625 and the plurality of sensors 627, in order to send and receive data and/or instructions with the motors 625 and sensors 627. The visual display device may comprise various types of screens, monitors, displays, touchscreens, lights, or other visual presentation or emission elements, and the audio output device may comprise various types of speakers, alarms, horns, or other sound output elements. Further, the various input controls or devices may comprise touchscreens, buttons, switches, knobs, microphones, or other types of input devices.

The controller 629 may also be in communication with a control system that may determine desired configurations of reconfigurable racks within a delivery facility, e.g., based on expected package mix or volume. Further details of a control system are described herein at least with respect to FIG. 10.

The controller 629 may receive data or instructions from a control system related to a desired configuration of an example reconfigurable rack 615. Based on the received data, the controller 629 may cause presentation of visual and/or audio information, via the visual display device and/or the audio output device, related to the desired configuration, e.g., instructions or information to assist agents in reconfiguring the reconfigurable rack. In addition, the controller 629 may also cause emission of visual and/or audio alerts, via the visual display device and/or the audio output device, related to the desired configuration, e.g., alerts or alarms to call agents' attention to reconfiguring the reconfigurable rack. Further, the controller 629 may stop causing presentation or emission of visual and/or audio information or alerts in response to determining that the reconfigurable rack has been adjusted to the desired configuration. In some examples, the controller 629 and/or the control system may also communicate with portable communication devices used by agents, and may provide information and/or alerts related to the desired configuration to such portable devices.

In further examples, based on the received data, the controller 629 may transmit instructions to the plurality of motors 625 to substantially automatically move or adjust the plurality of shelves 621 to a desired configuration. In addition, the controller 629 may receive data from the plurality of sensors 627 to detect current positions of the shelves 621, in order to determine whether to instruct movement or adjustment of the shelves 621, as well as to determine whether the movement or adjustment to the desired configuration is complete. Further, the controller 629 may stop transmitting instructions to the motors 625 and/or stop receiving data from the sensors 627 in response to determining that the reconfigurable rack has been adjusted to the desired configuration.

In the example of FIGS. 6A and 6B, the standardized package configuration of the reconfigurable rack 615 in FIG. 6A may be able to receive eight standardized containers 613 that contain standardized packages, e.g., two standardized containers 613 on each shelf 621 or level. In addition, the non-standardized package configuration of the reconfigurable rack 615 in FIG. 6B may be able to receive various types and sizes of non-standardized packages 619, e.g., various large, tall, or bulky packages.

Figures 7A, 7B:
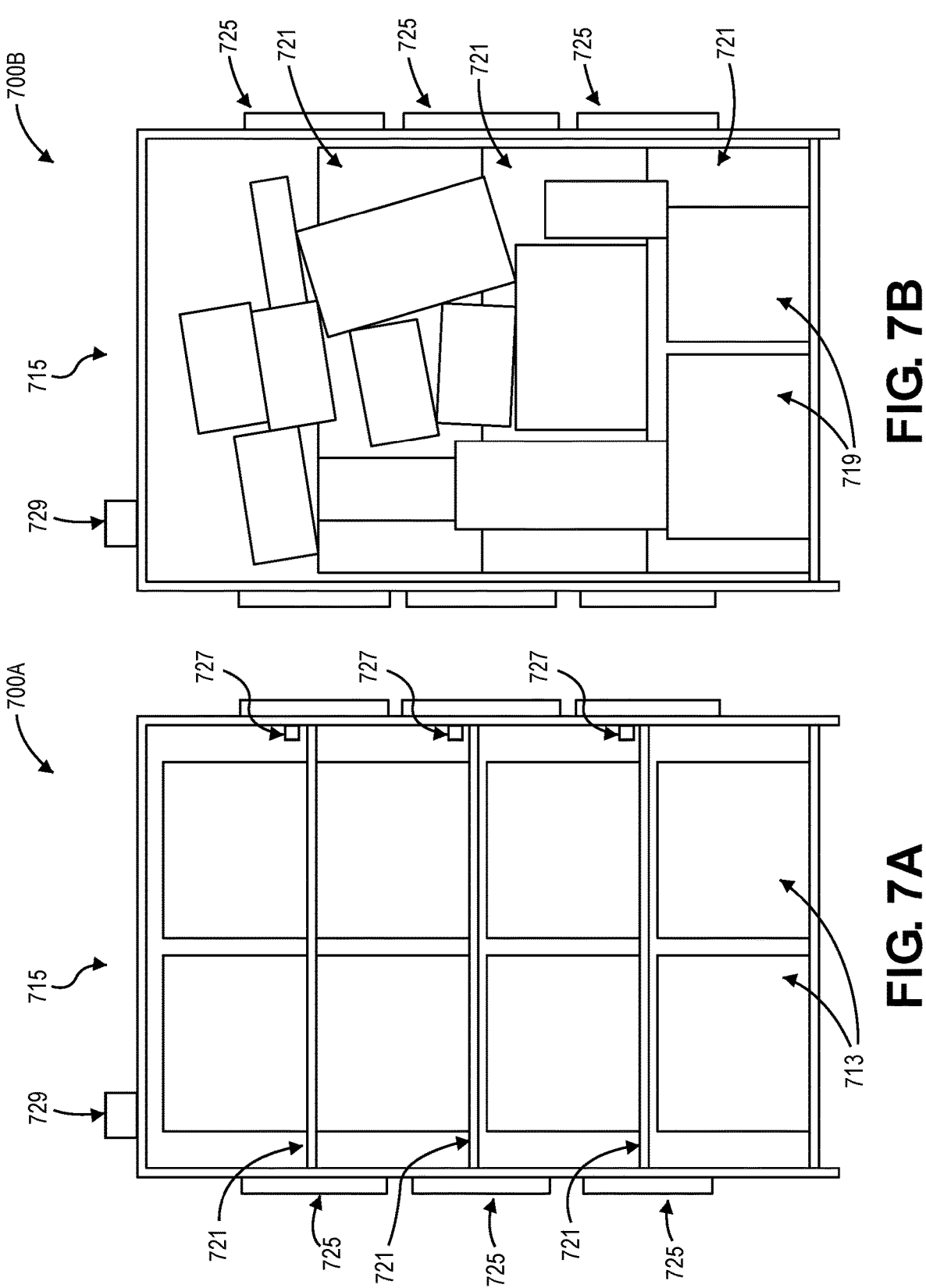
FIG. 7A is a schematic, front view diagram of a fifth example reconfigurable rack in a standardized package configuration, in accordance with implementations of the present disclosure.
FIG. 7B is a schematic, front view diagram of the fifth example reconfigurable rack in a non-standardized package configuration, in accordance with implementations of the present disclosure.

FIG. 7A is a schematic, front view diagram 700A of a fifth example reconfigurable rack in a standardized package configuration, in accordance with implementations of the present disclosure. FIG. 7B is a schematic, front view diagram 700B of the fifth example reconfigurable rack in a non-standardized package configuration, in accordance with implementations of the present disclosure.

As shown in FIGS. 7A and 7B, a fifth example reconfigurable rack 715 may comprise a frame or structure including a plurality of shelves 721 that may be translationally and/or rotationally moved between respective extended or retracted positions. In addition, the fifth reconfigurable rack 715 may include various actuators 725, sensors 727, and a controller 729.

The frame or structure may comprise a plurality of beams, columns, rods, plates, brackets, fasteners, or other structural elements formed to delineate a space or volume to receive various standardized containers and/or non-standardized packages. In addition, the frame or structure, the shelves 721, and/or other components may be formed of metals, plastics, composites, natural materials, or combinations thereof.

The plurality of shelves 721 may be movably and/or rotationally coupled to portions of the frame. The plurality of shelves 721 may comprise platforms or pedestals that are coupled to vertical movement members, e.g., tracks, guides, belts, or others, associated with or coupled between sides of the platforms and the frame. In addition, the platforms may also include rotational movement members, e.g., pivots, hinges, or others, that are associated with or coupled between sides of the platforms and the frame. Thus, the vertical movement members may be configured to allow translational movement, e.g., vertical movement, of the platforms along at least a portion of a height of the reconfigurable rack 715, and the rotational movement members may be configured to allow rotational movement of the platforms between extended and retracted positions. For example, as shown in FIG. 7A, the shelves 721 may be translationally moved, e.g., vertically, to respective extended positions, and the shelves 721 may be rotated to extended positions. In addition, as shown in FIG. 7B, the shelves 721 may be translationally moved, e.g., vertically, to respective retracted positions, and the shelves 721 may be rotated to retracted positions.

In some example embodiments, the plurality of shelves 721 may be substantially manually operated or moved, in order to reconfigure the fifth example reconfigurable rack 715 between the standardized package configuration, as shown in FIG. 7A, and the non-standardized package configuration, as shown in FIG. 7B. In some examples, the manual operation or reconfiguration may be performed by use of levers, cranks, slides, or other similar mechanical inputs or controls.

In other example embodiments, the fifth example reconfigurable rack 715 may be reconfigured semi-automatically or automatically between the standardized package configuration, as shown in FIG. 7A, and the non-standardized package configuration, as shown in FIG. 7B. In such examples, the fifth example reconfigurable rack 715 may include a plurality of motors 725, a plurality of sensors 727, and/or a controller 729.

The plurality of motors 725 may be coupled to movable portions of the shelves 721. e.g., at or near translatable and/or rotatable joints or connections of the shelves 721 to the frame. The plurality of motors 725 may comprise various types of motors, servos, solenoids, linear actuators, pneumatic actuators, geared mechanisms, or other types of actuators, and the plurality of motors 725 may be actuated by use of buttons, switches, knobs, touchscreens, other control inputs, or other electromechanical inputs or devices.

By actuation of the plurality of motors 725, the shelves 721 may be moved between respective extended positions, as shown in FIG. 7A, and respective retracted positions, as shown in FIG. 7B.

The plurality of sensors 727 may be coupled to portions of the frame and/or portions of the shelves 721. The plurality of sensors 727 may be configured to detect particular positions of the shelves 721 that may be associated with the standardized package configuration or the non-standardized package configuration. The plurality of sensors 727 may comprise various types of motor encoders, photoeyes, contact sensors, proximity sensors, or other types of sensors.

By receiving and processing data from the plurality of sensors 727, positions of the shelves 721 may be detected or determined between respective extended positions, as shown in FIG. 7A, and respective retracted positions, as shown in FIG. 7B.

The controller 729 may comprise a processor, memory, communication device, visual display device, audio output device, and/or various input controls or devices. For example, the controller 729 may be in communication with the plurality of motors 725 and the plurality of sensors 727, in order to send and receive data and/or instructions with the motors 725 and sensors 727. The visual display device may comprise various types of screens, monitors, displays, touchscreens, lights, or other visual presentation or emission elements, and the audio output device may comprise various types of speakers, alarms, horns, or other sound output elements. Further, the various input controls or devices may comprise touchscreens, buttons, switches, knobs, microphones, or other types of input devices.

The controller 729 may also be in communication with a control system that may determine desired configurations of reconfigurable racks within a delivery facility, e.g., based on expected package mix or volume. Further details of a control system are described herein at least with respect to FIG. 10.

The controller 729 may receive data or instructions from a control system related to a desired configuration of an example reconfigurable rack 715. Based on the received data, the controller 729 may cause presentation of visual and/or audio information, via the visual display device and/or the audio output device, related to the desired configuration, e.g., instructions or information to assist agents in reconfiguring the reconfigurable rack. In addition, the controller 729 may also cause emission of visual and/or audio alerts, via the visual display device and/or the audio output device, related to the desired configuration, e.g., alerts or alarms to call agents' attention to reconfiguring the reconfigurable rack. Further, the controller 729 may stop causing presentation or emission of visual and/or audio information or alerts in response to determining that the reconfigurable rack has been adjusted to the desired configuration. In some examples, the controller 729 and/or the control system may also communicate with portable communication devices used by agents, and may provide information and/or alerts related to the desired configuration to such portable devices.

In further examples, based on the received data, the controller 729 may transmit instructions to the plurality of motors 725 to substantially automatically move or adjust the plurality of shelves 721 to a desired configuration. In addition, the controller 729 may receive data from the plurality of sensors 727 to detect current positions of the shelves 721, in order to determine whether to instruct movement or adjustment of the shelves 721, as well as to determine whether the movement or adjustment to the desired configuration is complete. Further, the controller 729 may stop transmitting instructions to the motors 725 and/or stop receiving data from the sensors 727 in response to determining that the reconfigurable rack has been adjusted to the desired configuration.

In the example of FIGS. 7A and 7B, the standardized package configuration of the reconfigurable rack 715 in FIG. 7A may be able to receive eight standardized containers 713 that contain standardized packages, e.g., two standardized containers 713 on each shelf 721 or level. In addition, the non-standardized package configuration of the reconfigurable rack 715 in FIG. 7B may be able to receive various types and sizes of non-standardized packages 719, e.g., various large, tall, or bulky packages.

Although FIGS. 3A-7B illustrate particular example embodiments of reconfigurable racks, other example embodiments may include various modifications or combinations of the example embodiments described herein. For example, various reconfigurable shelves may have different or additional movements or adjustments, such as rotation, translation, telescoping, folding, extending, collapsing, or others. In addition, various other types of motors or actuators may be used to cause the various types of movements or adjustments. Further, other types of sensors may also be used, such as imaging sensors, time of flight sensors, or others, to detect positions or configurations of shelves or other components of the reconfigurable racks. Moreover, although the example embodiments illustrate particular numbers, locations, and arrangements of shelves, support arms, linkages, motors, sensors, controllers, and/or other components, other example embodiments may include other numbers, locations, and arrangements of the various components.

In further example embodiments, the various fixed racks and/or reconfigurable racks described herein may be generally stationary, or may be movable, e.g., manually, semi-automatically, and/or automatically. In some examples, the fixed and/or reconfigurable racks may have wheels, rollers, sliders, or other elements to enable movement of the racks within a facility. In other examples, the fixed and/or reconfigurable racks may be configured to be engaged, lifted, or otherwise coupled to one or more mobile drive units, automated guided vehicles, or other robotic drive units, which may then lift, push, pull, or otherwise move the racks within a facility.

In additional example embodiments, the various fixed racks and/or reconfigurable racks described herein may be reconfigured in various configurations, arrangements, or layouts, including various clusters, aisles, or other groupings, within a facility. The different layouts may facilitate sortation or storage of packages according to various geographical or logical groupings.

In still other example embodiments, at least portions of the fixed racks and/or reconfigurable racks described herein may be moved or translated vertically to provide ergonomic operations or processes for agents or personnel. For example, for reconfigurable racks, one or more shelves, platforms, or other portions of the racks may be dynamically moved or translated to various vertical positions, e.g., based on height and/or reach requirements for different agents or personnel, as well as different placement positions for packages. In other examples, for racks that may be engaged, lifted, and/or moved by automated guided vehicles or robotic drive units, at least portions of the racks may be dynamically moved or translated to various vertical positions using lifting platforms or components associated with the automated guided vehicles or robotic drive units, e.g., based on height and/or reach requirements for different agents or personnel, as well as different placement positions for packages. In further examples, various racks may be positioned on mezzanines, platforms, stands, or other structures that may include various actuators and components to dynamically move or translate any racks received thereon to various vertical positions, e.g., based on height and/or reach requirements for different agents or personnel, as well as different placement positions for packages.

Figure 8:
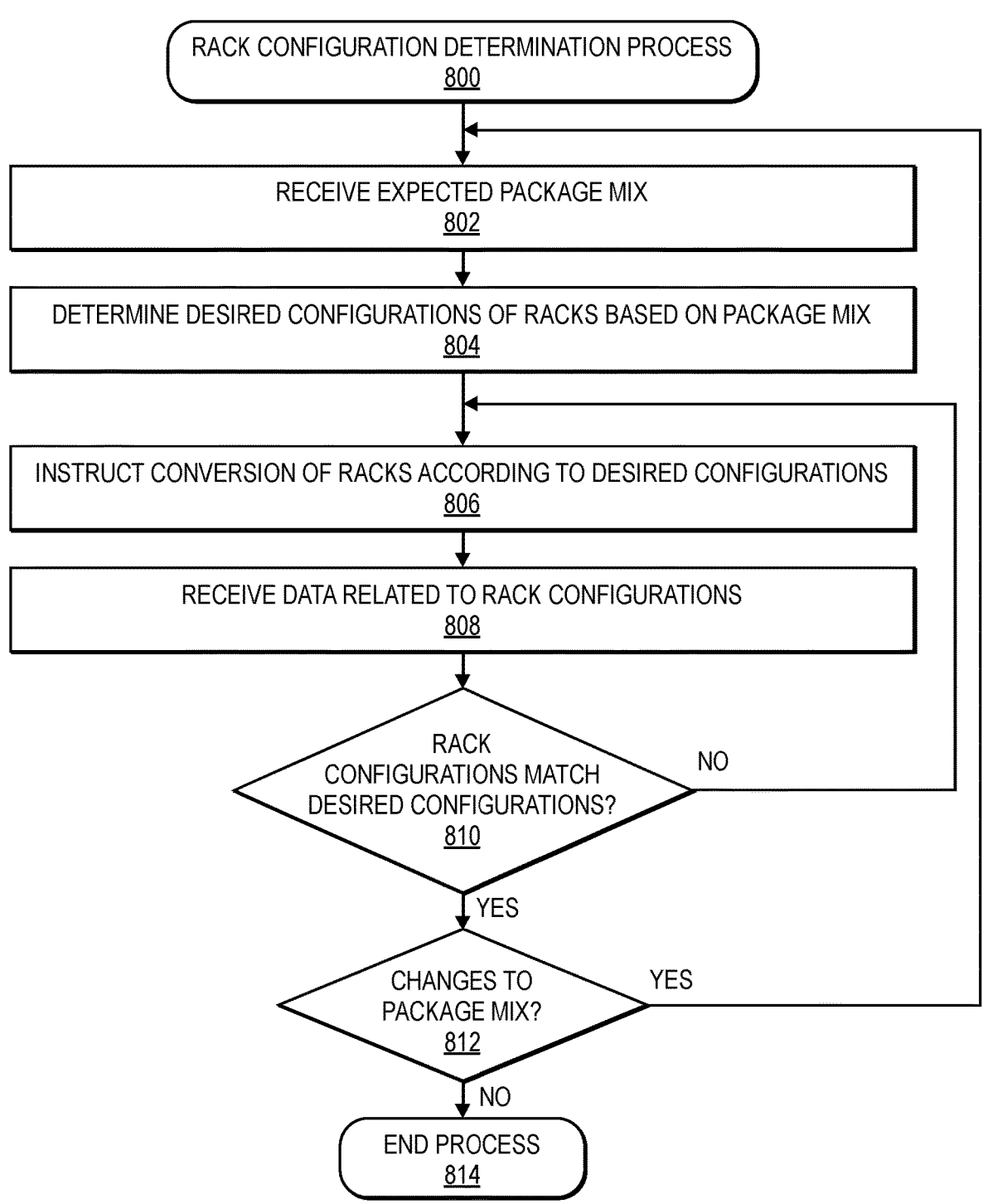
FIG. 8 is a flow diagram illustrating an example rack configuration determination process, in accordance with implementations of the present disclosure.

FIG. 8 is a flow diagram illustrating an example rack configuration determination process 800, in accordance with implementations of the present disclosure.

The process 800 may begin by receiving an expected package mix, as at 802. For example, the expected package mix may be received or determined based on expected deliveries to one or more zip codes, regions, geographical areas, routes, customers, or entities over a time duration, e.g., one day, a few days, one week, or other time durations. The expected package mix may include a number or volume of standardized packages, e.g., envelopes, pouches, bags, small boxes, or other packages having generally small dimensions or volumes, as well as a number or volume of non-standardized packages, e.g., boxes or packages having generally larger, taller, or bulkier dimensions or volumes. In some examples, standardized packages may be referred to as non-oversized packages that may be combined or sorted together into standardized containers, which are then sorted to racks that are in standardized package configurations. In addition, non-standardized packages may be referred to as oversized packages that may be individually sorted to racks that are in non-standardized package configurations. Further, a control system may command or instruct receiving or determining an expected package mix.

The process 800 may continue by determining desired configurations of racks based on the package mix, as at 804. For example, based on the expected package mix for individual aisles associated with one or more zip codes, regions, routes, or entities, desired configurations of a plurality of racks of a plurality of aisles may be determined in order to receive and accommodate the expected package mix. The desired configurations may include various combinations of racks of the plurality of aisles that are configured in either the standardized package configuration or the non-standardized package configuration. As a result, reconfigurable racks of the plurality of racks may be designated to be configured in either the standardized package configuration or the non-standardized package configuration based on the determined desired configurations. Further, a control system may command or instruct determining desired configurations of racks of a plurality of aisles based on the expected package mix.

The process 800 may proceed by instructing conversion of racks according to the desired configurations, as at 806. For example, reconfigurable racks of the plurality of racks may then be instructed to be configured in either the standardized package configuration or the non-standardized package configuration based on the determined desired configurations. In some examples, the reconfiguration of one or more racks may be performed substantially manually by agents or personnel, e.g., based on instructions, information, or alerts that may be provided or presented. In other examples, the reconfiguration of one or more racks may be performed at least partially automatically or substantially completely automatically, e.g., based on instructions or commands provided to motors or actuators associated with movable components of reconfigurable racks, as well as based on data or information received from sensors related to current positions or configurations of movable components of reconfigurable racks. In further examples, racks may already be configured in desired configurations, such that no additional conversion is needed. In such cases, the process 800 may proceed to step 812 or 814 described herein. Further, a control system may command or instruct conversion of racks according to the desired configurations.

The process 800 may then continue to receive data related to rack configurations, as at 808. For example, data related to current positions or configurations of movable components of reconfigurable racks may be received. In some examples, inputs or confirmations of reconfigurations of racks may be received from agents or personnel, e.g., control inputs or confirmations related to completed reconfigurations. In other examples, data or information related to current positions or configurations of movable components of reconfigurable racks may be received from one or more sensors, whether the reconfigurations were performed manually, semi-automatically, or automatically. Further, a control system may command or instruct receiving data related to rack configurations.

The process 800 may proceed to determine whether the rack configurations match the desired configurations, as at 810. For example, based on inputs or confirmations received from agents or personnel, it may be determined that reconfigurable racks have been configured to the desired configurations. In addition, based on data or information from sensors associated with reconfigurable racks, it may be determined whether the reconfigurable racks have been manually, semi-automatically, or automatically configured to the desired configurations, e.g., based on current positions or configurations of movable components of reconfigurable racks. Further, a control system may command or instruct determining whether the rack configurations match the desired configurations.

Alternatively or in addition, one or more time limits, timeouts, and/or other overrides may apply to the determination of whether rack configurations match desired configurations. For example, instructions, information, and/or alerts may be provided periodically before the start of operations, before a shift, and/or before other timepoints associated with package sortation/storage processes, and a final set of instructions, information, and/or alerts may be provided at a final time limit or timeout before proceeding with various package sortation/storage processes using racks according to their current configurations. In addition, one or more agents or other personnel within a facility may override or cancel one or more rack configurations for various reasons, e.g., conversion of a rack is not possible or needed, a rack is broken, stuck, or missing, no available personnel to perform rack conversion, other real-time or spontaneous changes to package sortation/storage processes, and/or various other reasons to override one or more desired rack configurations.

If it is determined that the rack configurations do not match the desired configurations, the process 800 may return to step 806 to continue instructing conversion of one or more reconfigurable racks based on the desired configurations.

If, however, it is determined that the rack configurations do match the desired configurations, and/or if one or more timeout or override conditions applies, the process 800 may continue with determining whether there are changes to the package mix, as at 812. For example, the expected package mix may change at various times, e.g., during holidays, during different seasons, over the course of months or weeks, every day, with each shift, or more frequently. Such changes to package mix may affect the desired configurations of reconfigurable racks in order to receive and accommodate the expected package mix. Further, a control system may command or instruct determining whether there are changes to the package mix.

If it is determined that there are changes to the package mix, the process 800 may return to step 802 to receive the updated package mix and determine desired configurations of racks based on the updated package mix.

If, however, it is determined that there are no changes to the package mix, the process 800 may then end, as at 814.

Figure 9:
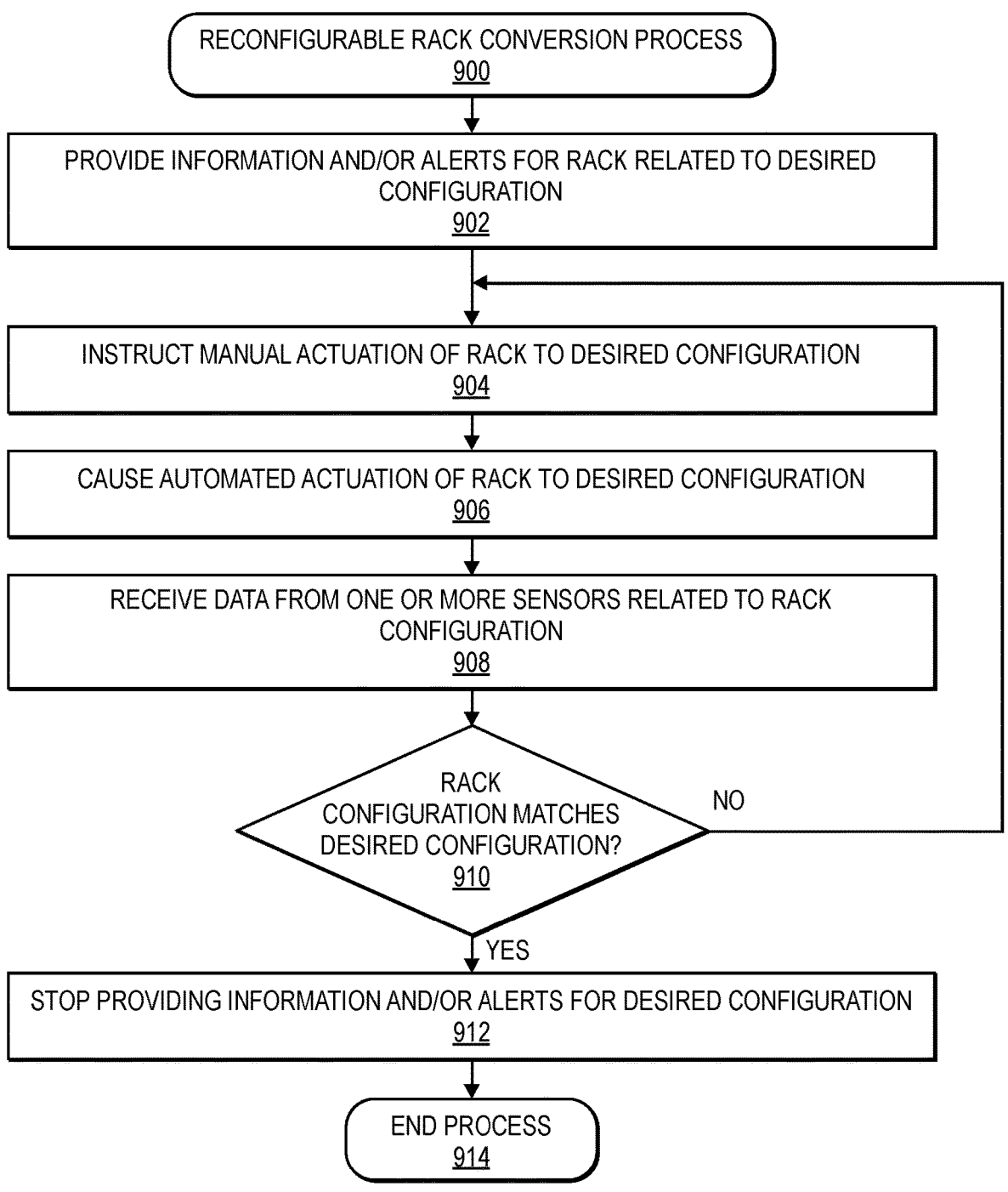
FIG. 9 is a flow diagram illustrating an example reconfigurable rack conversion process, in accordance with implementations of the present disclosure.

FIG. 9 is a flow diagram illustrating an example reconfigurable rack conversion process 900, in accordance with implementations of the present disclosure.

The process 900 may begin by providing information and/or alerts for a rack related to a desired configuration, as at 902. For example, for an individual reconfigurable rack that is to be reconfigured between the standardized package configuration and the non-standardized package configuration, various information and/or alerts may be presented or emitted. In some examples, a controller associated with the reconfigurable rack may include various visual display devices and/or audio output devices configured to present information, illuminate lights, provide audio instructions or information, and/or emit alerts or alarms related to reconfiguration of a rack. Further, a control system may command or instruct presentation or emission of various information and/or alerts related to reconfiguration of a reconfigurable rack.

The process 900 may continue by instructing manual actuation of the rack to the desired configuration, as at 904. For example, for manual and/or semi-automatic reconfiguration of a rack, agents or personnel may receive the various information and/or alerts and perform at least portions of the reconfiguration of the rack based on the provided information and/or alerts. Various components of the reconfigurable rack may be moved, repositioned, or reconfigured according to the desired configuration. Further, a control system may command or instruct manual actuation of the rack to the desired configuration.

The process 900 may proceed by causing automated actuation of the rack to the desired configuration, as at 906. For example, for semi-automatic and/or substantially automatic reconfiguration of a rack, various instructions or commands may be transmitted to a controller of the reconfigurable rack. In addition, various motors or actuators may be instructed or commanded by the controller to move, reposition, or reconfigure movable components of the reconfigurable rack according to the desired configuration. Further, a control system may command or instruct automated actuation of the rack to the desired configuration.

The process 900 may then continue to receive data from one or more sensors related to the rack configuration, as at 908. For example, during or after manual, semi-automatic, or automatic reconfiguration of movable components of the reconfigurable rack, one or more sensors of the rack may detect current positions or configurations of the movable components. As described herein, the various sensors may detect positions or configurations of rotatable shelves, support arms, hanging shelves, linkages, telescoping shelves, translatable shelves, and/or other components of the rack. Further, a control system may command or instruct receiving data from various sensors related to the rack configuration.

The process 900 may proceed to determine whether the rack configuration matches the desired configuration, as at 910. For example, based on data or information from sensors associated with the reconfigurable rack, it may be determined whether the reconfigurable rack has been manually, semi-automatically, or automatically configured to the desired configuration, e.g., based on current positions or configurations of movable components of the reconfigurable rack. Further, a control system may command or instruct determining whether the rack configuration matches the desired configuration.

Alternatively or in addition, one or more time limits, timeouts, and/or other overrides may apply to the determination of whether rack configurations match desired configurations. For example, instructions, information, and/or alerts may be provided periodically before the start of operations, before a shift, and/or before other timepoints associated with package sortation/storage processes, and a final set of instructions, information, and/or alerts may be provided at a final time limit or timeout before proceeding with various package sortation/storage processes using racks according to their current configurations. In addition, one or more agents or other personnel within a facility may override or cancel one or more rack configurations for various reasons, e.g., conversion of a rack is not possible or needed, a rack is broken, stuck, or missing, no available personnel to perform rack conversion, other real-time or spontaneous changes to package sortation/storage processes, and/or various other reasons to override one or more desired rack configurations.

If it is determined that the rack configuration does not match the desired configuration, the process 900 may return to step 904 to continue instructing actuation of one or more movable components of the reconfigurable rack based on the desired configuration.

If, however, it is determined that the rack configuration does match the desired configuration, and/or if one or more timeout or override conditions applies, the process 900 may continue with stopping the providing of information and/or alerts for a rack related to the desired configuration, as at 912. For example, for the individual reconfigurable rack that has been reconfigured to the desired configuration, e.g., either the standardized package configuration or the non-standardized package configuration, presentation or emission of various information and/or alerts may be stopped. In some examples, a controller associated with the reconfigurable rack may include various visual display devices and/or audio output devices configured to present information, illuminate lights, provide audio instructions or information, and/or emit alerts or alarms related to reconfiguration of a rack, and the controller may stop presentation or emission of such information and/or alerts. Further, a control system may command or instruct stopping of presentation or emission of various information and/or alerts related to reconfiguration of the reconfigurable rack.

The process 900 may then end, as at 914.

Figure 10:
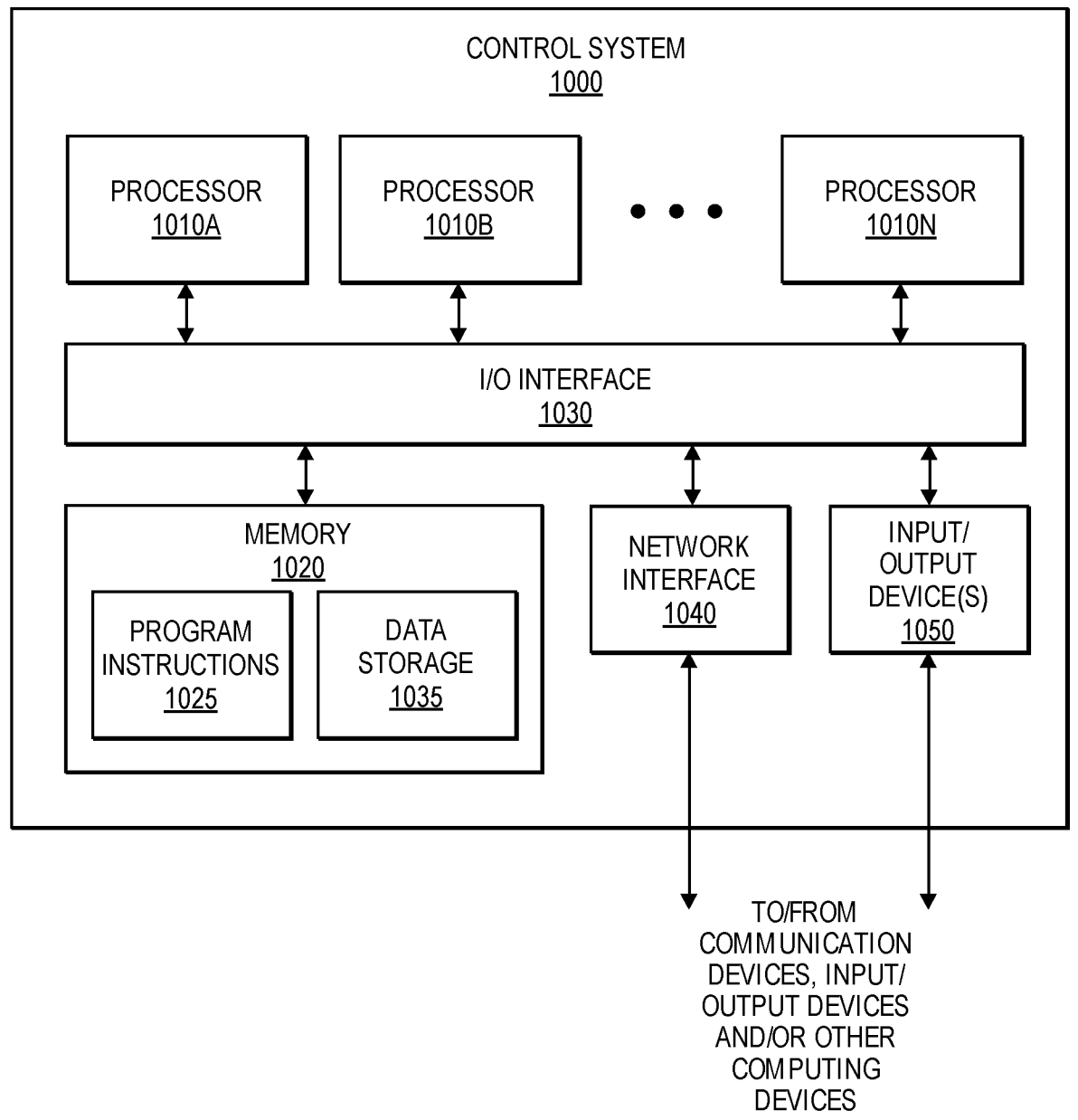
FIG. 10 is a block diagram illustrating various components of an example control system, in accordance with implementations of the present disclosure.

FIG. 10 is a block diagram illustrating various components of an example control system 1000, in accordance with implementations of the present disclosure.

Various operations of a control system or controller, such as those described herein, may be executed on one or more computer systems, and/or interacting with various other computers, systems, or devices in a delivery facility or other material handling facility, according to various implementations. For example, the control system or controller discussed above may function and operate on one or more computer systems. In the illustrated implementation, a control system 1000 includes one or more processors 1010A, 1010B through 1010N, coupled to a non-transitory computer-readable storage medium 1020 via an input/output (I/O) interface 1030. The control system 1000 further includes a network interface 1040 coupled to the I/O interface 1030, and one or more input/output devices 1050. In some implementations, it is contemplated that a described implementation may be implemented using a single instance of the control system 1000 while, in other implementations, multiple such systems or multiple nodes making up the control system 1000 may be configured to host different portions or instances of the described implementations. For example, in one implementation, some data sources or services (e.g., related to portions of package storage space optimization systems, operations, or processes, etc.) may be implemented via one or more nodes of the control system 1000 that are distinct from those nodes implementing other data sources or services (e.g., related to other portions of package storage space optimization systems, operations, or processes, etc.).

In various implementations, the control system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the control system 1000. Generally speaking, a non-transitory, computer-readable storage medium may include storage media or memory media such as magnetic or optical media, e.g., disk or CD/DVD-ROM, coupled to the control system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the control system 1000 and other devices attached to a network, such as other control systems, rack controllers, delivery facility control systems, material handling system controllers, warehouse management systems, portable communication devices, other computer systems, conveyance mechanisms, equipment, or systems, various types of sensors, various types of vision systems, imaging devices, or imaging sensors, upstream stations or processes, downstream stations or processes, other material handling systems or equipment, or between nodes of the control system 1000. In various implementations, the network interface 1040 may support communication via wired or wireless general data networks, such as any suitable type of Ethernet network.

Input/output devices 1050 may, in some implementations, include one or more displays, screens, monitors, projection devices, other visual input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1000. Multiple input/output devices 1050 may be present in the control system 1000 or may be distributed on various nodes of the control system 1000. In some implementations, similar input/output devices may be separate from the control system 1000 and may interact with one or more nodes of the control system 1000 through a wired or wireless connection, such as over the network interface 1040.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The program instructions 1025 may include various executable instructions, programs, or applications to facilitate package storage space optimization operations and processes described herein, such as conveyance mechanism controllers, drivers, or applications, reconfigurable rack controllers, drivers, or applications, visual display device controllers, drivers, or applications, audio output device controllers, drivers, or applications, motor or actuator controllers, drivers, or applications, sensor controllers, drivers, or applications, sensor data processing applications, material handling equipment controllers, drivers, or applications, upstream station controllers, drivers, or applications, downstream station controllers, drivers, or applications, etc. The data storage 1035 may include various data stores for maintaining data related to systems, operations, or processes described herein, such as delivery facilities, clusters, aisles, zip codes, regions, geographical areas, routes, customers, or entities, expected package mix, fixed racks, reconfigurable racks, standardized containers, standardized packages, non-standardized packages, standardized package configurations, non-standardized package configurations, motors, actuators, sensors, sensor data, information, instructions, alerts, material handling equipment or apparatus, upstream systems, stations, or processes, downstream systems, stations, or processes, etc.

Those skilled in the art will appreciate that the control system 1000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8 and 9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A package storage space optimization method, comprising:

receiving, by a control system, an expected package mix for a delivery facility, the expected package mix including standardized packages and non-standardized packages, and the delivery facility comprising a plurality of fixed racks and a plurality of reconfigurable racks, wherein the plurality of fixed racks have predetermined, non-reconfigurable configurations;

determining, by the control system, desired configurations for the plurality of reconfigurable racks based on the expected package mix, the desired configurations including a standardized package configuration configured to receive standardized packages and a non-standardized package configuration configured to receive non-standardized packages;

instructing, by the control system, automated conversion of at least some of the plurality of reconfigurable racks to respective desired configurations;

receiving, by the control system, data related to current configurations of the at least some of the plurality of reconfigurable racks;

determining, by the control system, that the current configurations match the respective desired configurations for the at least some of the plurality of reconfigurable racks; and determining, by the control system, that the automated conversion is complete based on the comparison;

wherein the delivery facility comprises a plurality of clusters, individual clusters comprising a plurality of aisles; and wherein individual aisles comprise a respective number of fixed racks, and a respective number of reconfigurable racks.

2. The package storage space optimization method of claim 1, wherein individual aisles are associated with one or more respective delivery zip codes, regions, geographical areas, routes, customers, or entities.

3. The package storage space optimization method of claim 1, wherein the respective number of fixed racks includes a first number of fixed racks having the standardized package configuration and a second number of fixed racks having the non-standardized package configuration.

4. A method, comprising:

receiving, by a control system, an expected package mix for a facility, the expected package mix including standardized packages and non-standardized packages, and the facility comprising a plurality of fixed racks and a plurality of reconfigurable racks, wherein the plurality of fixed racks have predetermined, non-reconfigurable configurations;

determining, by the control system, a desired configuration for at least one reconfigurable rack based on the expected package mix, the desired configuration including a standardized package configuration configured to receive standardized packages or a non-standardized package configuration configured to receive non-standardized packages; and instructing, by the control system, at least partially automated conversion of the at least one reconfigurable rack to the desired configuration;

wherein the facility comprises a plurality of aisles, individual aisles having a respective first number of fixed racks having the standardized package configuration, a respective second number of fixed racks having the non-standardized package configuration, and a respective third number of reconfigurable racks that can be configured in either the standardized package configuration or the non-standardized package configuration.

5. The method of claim 4, wherein the standardized packages are configured to be placed within standardized containers, the standardized containers being configured to be received by racks having the standardized package configuration.

6. The method of claim 4, wherein for individual aisles, the respective third number of reconfigurable racks is positioned between the respective first number of fixed racks and the respective second number of fixed racks.

7. The method of claim 4, wherein the at least one reconfigurable rack comprises a controller; and the method further comprising:

transmitting, by the control system to the controller, information related to the desired configuration for the at least one reconfigurable rack.

8. The method of claim 7, wherein the at least one reconfigurable rack further comprises at least one of a visual display device or an audio output device; and the method further comprising at least one of:

causing, by the control system via the controller, emission of an alert related to the desired configuration by at least one of the visual display device or the audio output device; or causing, by the control system via the controller, presentation of information related to the desired configuration by at least one of the visual display device or the audio output device.

9. The method of claim 8, wherein the at least one reconfigurable rack further comprises an actuator configured to reconfigure at least one component of the at least one reconfigurable rack; and the method further comprising:

causing, by the control system via the controller, reconfiguration of the at least one component by the actuator according to the desired configuration.

10. The method of claim 8, wherein the at least one reconfigurable rack further comprises a sensor configured to detect a current configuration of at least one component of the at least one reconfigurable rack; and the method further comprising:

causing, by the control system via the controller, detection of the current configuration of the at least one component by the sensor.

11. The method of claim 10, further comprising:

receiving, by the control system via the controller, data related to the current configuration of the at least one component detected by the sensor; and determining, by the control system, that the current configuration of the at least one component corresponds to the desired configuration of the at least one reconfigurable rack.

12. The method of claim 11, further comprising responsive to determining that the current configuration corresponds to the desired configuration of the at least one reconfigurable rack:

causing, by the control system via the controller, stopping of emission of the alert related to the desired configuration by at least one of the visual display device or the audio output device; or causing, by the control system via the controller, stopping of presentation of information related to the desired configuration by at least one of the visual display device or the audio output device.

13. A storage system, comprising:

a facility having a plurality of aisles, individual aisles comprising a plurality of fixed racks and a plurality of reconfigurable racks;

wherein the plurality of fixed racks have predetermined, non-reconfigurable configurations including a first number of fixed racks having a standardized package configuration, and a second number of fixed racks having a non-standardized package configuration;

wherein the plurality of reconfigurable racks includes a third number of reconfigurable racks that can be configured in either the standardized package configuration or the non-standardized package configuration;

wherein at least one reconfigurable rack is configured to be at least partially automatically converted between the standardized package configuration and the non-standardized package configuration.

14. The storage system of claim 13, wherein for individual aisles, the third number of reconfigurable racks is positioned between the first number of fixed racks and the second number of fixed racks.

15. The storage system of claim 13, wherein individual aisles are associated with one or more respective delivery zip codes, regions, geographical areas, routes, customers, or entities.

16. The storage system of claim 13, wherein the at least one reconfigurable rack is configured to be at least partially automatically converted to a desired configuration that is determined based on an expected package mix among standardized packages and non-standardized packages;

wherein the desired configuration is one of the standardized package configuration or the non-standardized package configuration.

17. The storage system of claim 13, wherein the at least one reconfigurable rack includes a controller, a visual display device, an audio output device, an actuator, and a sensor configured to at least partially automatically convert the at least one reconfigurable rack between the standardized package configuration and the non-standardized package configuration.

* * * * *